United States Patent
Nakano et al.

(10) Patent No.: US 8,292,710 B2
(45) Date of Patent: Oct. 23, 2012

(54) GAME PROGRAM AND GAME APPARATUS

(75) Inventors: Takao Nakano, Kyoto (JP); Toru Hoga, Fukuoka (JP)

(73) Assignees: Nintendo Co., Ltd., Kyoto (JP); Ganbarion Co., Ltd., Fukuoka (JP)

( * ) Notice: Subject to any disclaimer, the term of this patent is extended or adjusted under 35 U.S.C. 154(b) by 563 days.

(21) Appl. No.: 11/351,267

(22) Filed: Feb. 10, 2006

(65) Prior Publication Data

US 2006/0281545 A1 Dec. 14, 2006

(30) Foreign Application Priority Data

Jun. 10, 2005 (JP) ................................. 2005-171693

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/9; 463/30; 463/31; 463/37; 463/43; 463/44

(58) Field of Classification Search .................... 463/30, 463/31, 37, 43, 44, 9

See application file for complete search history.

(56) References Cited

U.S. PATENT DOCUMENTS

| | | | | |
|---|---|---|---|---|
| 5,951,397 A | * | 9/1999 | Dickinson ........................ | 463/36 |
| 6,152,821 A | * | 11/2000 | Nakagawa et al. ................ | 463/4 |
| 6,306,033 B1 | * | 10/2001 | Niwa et al. ......................... | 463/1 |
| 6,439,998 B1 | * | 8/2002 | Itou ................................... | 463/43 |
| 6,542,155 B1 | * | 4/2003 | Mifune et al. .................. | 345/428 |
| 2002/0137564 A1 | * | 9/2002 | Kawazu ........................... | 463/43 |
| 2002/0142817 A1 | * | 10/2002 | Nakazawa et al. ................. | 463/7 |
| 2005/0054402 A1 | | 3/2005 | Noguchi et al. | |

FOREIGN PATENT DOCUMENTS

| | | |
|---|---|---|
| JP | 2572879 | 2/1996 |
| JP | 2004-033437 | 2/2004 |
| JP | 2005-34277 A | 2/2005 |

OTHER PUBLICATIONS

"Weekly Shonen Jump", issued by Shueisya, Jan. 31, 2005, vol. 38, No. 5, 3 pages, with a partial translation (Nos. 1-13).

"V Jump", issued by Shueisya, Feb. 1, 2005, vol. 13, No. 2 (Whole No. 140), 3 pages, with a partial translation (No. 14).

(Continued)

*Primary Examiner* — Ronald Laneau
*Assistant Examiner* — Adetokunbo Torimiro
(74) *Attorney, Agent, or Firm* — Nixon & Vanderhye P.C.

(57) ABSTRACT

An operation panel for arranging a character piece is displayed in a display device, and, based on a player instruction, a plurality of character pieces are sequentially arranged to a position which is in the operation panel and designated by the player. The operation panel accordingly generated is displayed together with a game world, a character associated with a character piece selected by the player is caused to appear in the game world, and an action of the character is controlled based on the player instruction. Accordingly, it is possible to provide a new game which allows the player to arrange one or more character images, from among a plurality of character images, in the operation panel area and to select a character to appear in the game world by using the operation panel generated as above.

10 Claims, 23 Drawing Sheets

OTHER PUBLICATIONS

Inside Games, "Jump Super Stars,", http://www.inside-games.jp/article/2004/12/20/15316.html, Dec. 20, 2004, with partial English translation.

Famitsu, "Heroes of Popular Comics Gather! Jump Super Stars", http://www.famitsu.com/game/coming/2005/01/21/104, 1106292849, 35606,0,0.html, Jan. 24, 2005, with partial English translation.

Monthly Arcadia Magazine, No. 018, Nov. 2001, with partial English translation.

The Wonderswan Books SD Gundam G Generation Gather Beat 2 Perfect Guide, Jul. 2, 2001, with partial English translation.

* cited by examiner

FIG. 4A
BASE PIECE A1
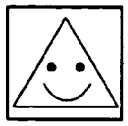
FIG. 4B
CUT PIECE A2    SUPPORT PIECE A2
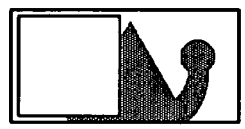 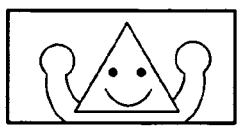
FIG. 4C
CUT PIECE A3    SUPPORT PIECE A3
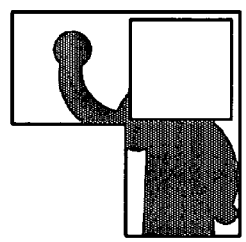 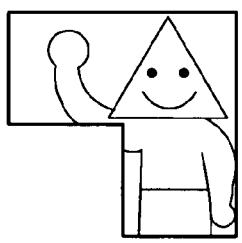
FIG. 4D
CUT PIECE A4    BATTLE PIECE A4
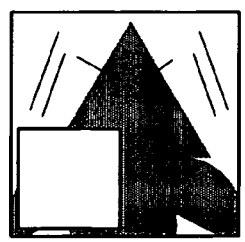 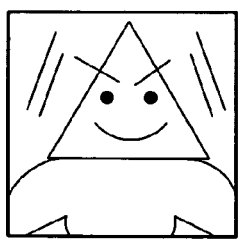
FIG. 4E
CUT PIECE A5    BATTLE PIECE A5
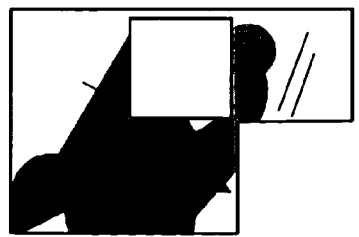 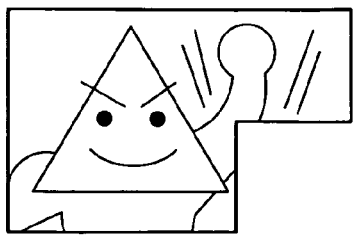

FIG. 16

CHARACTER PIECE INFORMATION 42

| PIECE | CHARACTER | SIZE | SEX | PRIMARY ABILITY CHARACTERISTICS ||| FUNCTIONS AS A KEY (COMMAND TO BE INPUTTED) | ACQUIS-ITION FLAG |
| --- | --- | --- | --- | --- | --- | --- | --- | --- |
| | | | | HP | ATTACK POWER | SPECIAL ATTACK | | |
| BASE PIECE A1 | CHARACTER A | 1 | MALE | — | — | — | — | — |
| CUT PIECE A2 | CHARACTER A | 2 | MALE | — | — | — | — | OFF |
| CUT PIECE A3 | CHARACTER A | 3 | MALE | — | — | — | — | OFF |
| CUT PIECE A4 | CHARACTER A | 4 | MALE | — | — | — | — | OFF |
| CUT PIECE A5 | CHARACTER A | 5 | MALE | — | — | — | — | ON |
| SUPPORT PIECE A2 | CHARACTER A | 2 | MALE | — | — | — | CAUSE SUPPORT ATTACK X | ON |
| SUPPORT PIECE A3 | CHARACTER A | 3 | MALE | — | — | — | CAUSE SUPPORT ATTACK Y | ON |
| BATTLE PIECE A4 | CHARACTER A | 4 | MALE | 60 | 40 | SPECIAL ATTACK X | EXCHANGE CHARACTERS, CAUSE REGULAR ATTACK X | ON |
| BATTLE PIECE A5 | CHARACTER A | 5 | MALE | 70 | 60 | SPECIAL ATTACK Y | EXCHANGE CHARACTERS, CAUSE REGULAR ATTACK Y | OFF |
| BASE PIECE B1 | CHARACTER B | 1 | FEMALE | — | — | — | — | — |
| CUT PIECE B2 | CHARACTER B | 2 | FEMALE | — | — | — | — | ON |
| CUT PIECE B3 | CHARACTER B | 3 | FEMALE | — | — | — | — | OFF |
| CUT PIECE B4 | CHARACTER B | 4 | FEMALE | — | — | — | — | OFF |
| ... | ... | ... | ... | ... | ... | ... | ... | ... |

FIG. 17

| COMPATIBILITY INFORMATION 43 | | |
|---|---|---|
| CHARACTER | CONDITIONS | EFFECTS ON ABILITY CHARACTERISTICS |
| CHARACTER A | ADJACENT TO CHARACTER C | UPPER LIMIT OF HP IS INCREASED BY TEN |
| CHARACTER C | ADJACENT TO CHARACTER A | UPPER LIMIT OF HP IS INCREASED BY TEN |
| CHARACTER D | ADJACENT TO CHARACTER E | ATTACK POWER IS INCREASED BY 10% |
| CHARACTER E | ADJACENT TO CHARACTER D | ATTACK POWER IS DECREASED BY 10% |
| CHARACTER F | FEMALE CHARACTER IS ON OPERATION PANEL | ATTACK POWER IS INCREASED BY THE NUMBER OF FEMALE CHARACTERS TIMES 10% |

FIG. 18

| SPECIAL PIECE INFORMATION 44 | | |
|---|---|---|
| PIECE | FUNCTIONS AS A KEY (COMMAND TO BE INPUTTED) | |
| | ARRANGEMENT CONDITIONS | FUNCTIONS |
| SPECIAL PIECE | SPECIAL PIECE IS ARRANGED BETWEEN BATTLE PIECE A AND BATTLE PIECE F | CAUSE COLLABORATED SPECIAL ATTACK AB |
| | SPECIAL PIECE IS ARRANGED BETWEEN BATTLE PIECE B AND BATTLE PIECE F | CAUSE COLLABORATED SPECIAL ATTACK AG |
| | BATTLE PIECE IS ARRANGED EITHER ONE OF LEFT OR RIGHT SIDE OF SPECIAL PIECE | CAUSE SINGLE SPECIAL ATTACK |
| | OTHER | — |

FIG. 19

OPERATION PANEL INFORMATION 45

OPERATION PANEL A

POSITIONAL ARRANGEMENT INFORMATION FOR EACH PIECE

THE MAXIMUM NUMBER OF SPECIAL ATTACKS FOR USE

ABILITY CHARACTERISTICS INFORMATION

| BATTLE PIECE | ABILITY CHARACTERISTICS | | |
|---|---|---|---|
| | H P | ATTACK POWER | SPECIAL ATTACK |
| BATTLE PIECE A4 | 4 0 | 4 0 | SPECIAL ATTACK X |
| BATTLE PIECE D5 | 6 0 | 6 0 | SPECIAL ATTACK Z |
| BATTLE PIECE G4 | 3 5 | 3 5 | SPECIAL ATTACK W |

OPERATION PANEL B

OPERATION PANEL C

⋮

GAME PROGRAM AND GAME APPARATUS

CROSS REFERENCE OF RELATED APPLICATION

The disclosure of Japanese Patent Application No. 2005-171693 is incorporated herein by reference.

BACKGROUND

1. Field of the Technology

The present technology relates to a game program and a game apparatus, and particularly, a game program and a game apparatus for realizing a game which allows a player to select a desired character from among a plurality of characters and to operate the selected character so as to play the game.

2. Description of the Background Art

Japanese Laid-Open Patent Publication No. 2004-33437 discloses a technique in which a plurality of parts corresponding to game items are arranged in a predetermined area, and ability characteristics of a character to be operated by the player can be set by the player in accordance with the position of the arranged parts in the predetermined area.

Japanese Patent No. 2572879 discloses a technique by which a user can freely change a position of a key image displayed on a data input device employing a touch panel scheme.

However, according to the technique disclosed in Japanese Laid-Open Patent Publication No. 2004-33437, although parts are arranged in a predetermined area, and ability characteristics of a character are changed in accordance with the position of the arranged parts, the parts arranged in the predetermined area cannot be used as keys while playing a game, and therefore, it is impossible to obtain a sense of entertainment therefrom.

Also, according to the technique disclosed in Japanese Patent No. 2572879, although a position of a key image can be freely set by a user, a function assigned to the key image is not changeable according to the positional arrangement for the key image. Thus, it is impossible to obtain a sense of entertainment from designing an arrangement for a key image such that the key image is assigned a desirable function.

SUMMARY

Therefore, a feature of an exemplary embodiment presented herein is to provide a game program and a game apparatus which allows a player to arrange one or more character images, from among a plurality of character images, in an area for an operation panel so as to generate an operation panel, and to select a character to appear in a game world by using the generated operation panel.

Also, another feature of an exemplary embodiment is to provide a game program and a game apparatus in which, when the player arranges one or more key images, from among a plurality of key images, in the area for an operation panel so as to generate an operation panel and uses the generated operation panel as input means, a command to be inputted when the player designates a key image changes according to a positional arrangement in the operation panel for the key image.

The exemplary embodiment presented herein employs the following configuration in order to solve the above problems. Reference numerals and notes in parentheses show a corresponding relationship with the drawings to help understand the exemplary embodiment, and are not in any way limiting the scope of the present invention.

A first aspect of the exemplary embodiment is directed to a computer readable storage medium storing a game program for realizing a game which allows a player to select a character from among a plurality of characters and to operate the selected character so as to play the game. The game program is for causing a computer (21) connected to display means (11, 12) for displaying a game image and input means (14, 15) for inputting a player instruction to execute a first display control step (S30), an operation panel generation step (S18), a second display control step (S68), an operation detection step (S72), and a character control step (S76). The first display control step is a step of causing the display means to display a predetermined operation panel area for arranging a character image. The operation panel generation step is a step of generating an operation panel by arranging, in accordance with a player instruction inputted through the input means, one or more character images, from among a plurality of character images respectively associated with the plurality of characters, designated by the player to a position which is in the operation panel and designated by the player. The second display control step is a step of causing the display means to display, together with a game image showing a game world, the operation panel generated in the operation panel generation step. The operation detection step is a step of detecting, by using the player instruction inputted through the input means, a character image which is in the operation panel and selected by the player. The character control step is a step of causing a character associated with the character image selected by the player to appear in the game world, and controlling, in accordance with a player instruction inputted through the input means, an action of the character.

In a first preferred example based on the first aspect, the character control step includes a determination step (S74) of determining whether the character associated with the character image selected by the player is same as a character already entered in the game world, and a character exchange step (S76) of exchanging, when the determination result in the determination step is "no", the character already entered in the game world for the character associated with the character image selected by the player, for the exchanged character to appear in the game world.

In a second preferred example based on the above first preferred example, the character control step further includes a step (S78) of causing, when the determination result in the determination step is "yes", the character already entered in the game world to perform a predetermined action.

In a third preferred example based on the above first aspect, the plurality of character images include sets each of which includes a plurality of character images, of various types, associated with a same character and having different sizes. The computer is caused to further execute a first ability characteristics setting step (S58) of changing, depending on the character associated with the character image selected by the player and the size of the character image, ability characteristics of the character associated with the selected character image.

In a fourth preferred example based on the above third preferred example, the game program causes the computer to further execute a parameter setting step (S56) of changing, depending on the number of character images arranged in the operation panel area, a value indicated by a predetermined game parameter (the maximum number of special attacks) which affects a difficulty level of a game.

In a fifth preferred example based on the above first aspect, the input means at least includes a touch panel (15) provided on a screen of the display means (12). The operation detection step includes: a first detection step (S70) of detecting, by using an output signal from the touch panel, a position which is on the screen of the display means and designated by the player; and a second detection step (S72, S82) of detecting, by using the position which is on the screen and detected in the first detection step, a character image which is in the operation panel and selected by the player.

In a sixth preferred example based on the above first aspect, the game program causes the computer to further execute a second ability characteristics setting step (S62) of changing, depending on whether, in the operation panel, a character image having a predetermined relationship with and being different from the selected character image is arranged to a position adjacent to the character image selected by the player, ability characteristics of the character associated with the character image selected by the player.

In a seventh example based on the above first aspect, the operation panel generation step includes a determination step (S46) of determining whether a first character image (base piece) to be arranged in the operation panel area by the player and a second character image (cut piece) already being arranged in the operation panel area satisfy a specific relationship, and a character image synthesis step (S48) of arranging in the operation panel area, when the determination result in the determination step is "yes", a third character image (support piece or battle piece) corresponding to the first and the second character images instead of separately arranging the two character images. The character control step includes a step (S72) of causing, when the character image selected by the player is either the first or the second character image, the character associated with the either of the first or the second character image not to appear in the game world, and causing, when the character image selected by the player is the third character image, a character associated with the third character image to appear in the game world.

In an eighth preferred example based on the above first aspect, the plurality of character images include a fourth character image (battle piece) whose size is larger than a predetermined size and a fifth character image (support piece) whose size is smaller than the predetermined size, and the character control step includes a step of causing, when the character image selected by the player is the fourth character image, a character associated with the fourth character image to appear in the game world, and causing, when the character image selected by the player is the fifth character, a support event for supporting a character entered in the game world to occur in the game world.

A second aspect of the exemplary embodiment is directed to a game program for causing a computer (21) connected to display means (11, 12) for displaying a game image and input means (14, 15) for inputting a player instruction to execute: a first display control step (S30); an operation panel generation step (S18); a second display control step (S68); an operation detection step (S72); and a game process step (S90). The first display control step is a step of causing the display means to display a predetermined operation panel area for arranging a key image (piece). The operation panel generation step is a step of generating an operation panel by arranging, in accordance with the player instruction inputted through the input means, one or more key images, from among a plurality of key images previously prepared, to a position which is in the operation panel area and designated by the player. The second display control step is a step of causing the display means to display, together with a game image showing a game world, the operation panel generated in the operation panel generation step. The operation detection step is a step of detecting, by using the player instruction inputted through the input means, a key image which is in the operation panel and selected by the player. The game process step is a step of causing, in response to an operation of selecting a key image performed by the player, an event to occur in the game world, the event being different in accordance with a positional arrangement for either the selected key image or another key image in the operation panel.

In a seventh preferred example based on the above second aspect, the game process step includes a step (S90) of causing an event to occur, the event being different in accordance with a combination of a plurality of key images which are adjacent to and different from the key image selected by the player in the operation panel.

In an eighth preferred example based on the above second aspect, the game process step includes a step (S104) of causing an event to occur, the event being different in accordance with whether, in the operation panel, a key image having a predetermined relationship with and being different from the key image selected by the player is arranged to a position adjacent to the selected key image.

In a ninth preferred example based on the above second aspect, the game process step includes a step of causing an event to occur, the event being different in accordance with a positional arrangement in the operation panel for the key image selected by the player (FIGS. 25, 26).

A third aspect of the exemplary embodiment is directed to a game apparatus for realizing a game which allows a player to select a character from among a plurality of characters and to operate the selected character so as to play the game, and the game apparatus comprises: display means (11, 12); input means (14, 15); first display control means (21, S30); operation panel generation means (21, S18); second display control means (21, S68); operation detection means (21, S72); and character control means (21, S76). The display means is for displaying a game image. The input means is for inputting a player instruction. The first display control means is for causing the display means to display a predetermined operation panel area for arranging a character image. The operation panel generation means is for generating an operation panel by arranging, in accordance with a player instruction inputted through the input means, one or more character images, from among a plurality of character images respectively associated with the plurality of characters, to a position which is in the operation panel area and designated by the player. The second display control means is for causing the display means to display, together with a game image showing a game world, the operation panel generated by the operation panel generation means. The operation detection means is for detecting, by using the player instruction inputted through the input means, a character image which is in the operation panel and selected by the player. The character control means is for causing a character associated with the character image selected by the player to appear in the game world and controlling, in accordance with a player instruction inputted through the input means, an action of the character.

A fourth aspect of the exemplary embodiment is directed to a game apparatus comprising: display means (11, 12); input means (14, 15); first display control means (21, S30); operation panel generation means (21, S18); second display control means (21, S68); operation detection means (21, S72); and game process means (21 S90). The display means is for displaying a game image. The input means is for inputting a player instruction. The first display control means is for causing the display means to display a predetermined operation panel area for arranging a key image. The operation panel generation means is for generating an operation panel by arranging, in accordance with a player instruction inputted through the input means, one or more key images, from among a plurality of key images previously prepared, to a position which is in the operation panel area and designated by the player. The second display control means is for causing the display means to display, together with a game image showing a game world, the operation panel generated by the operation panel generation means. The operation detection means is for detecting, by using the player instruction inputted through the input means, a key image which is in the operation panel and selected by the player. The game process means is for causing, in response to an operation of selecting a key image performed by the player, an event to occur in the game world, the event being different in accordance with a positional arrangement in the operation panel for either the selected key image or another key image.

According to the above first aspect of the exemplary embodiment, a character to appear in a game world is designated by a player using an operation panel generated by arranging character images in an operation panel area, and the player can arrange a character image corresponding to a character frequently used in a game play to a position easy for the player to select and a character image corresponding to a character infrequently used to another position. Accordingly, by skillfully arranging character images as exemplarily described above, it is possible to realize controllability best suited for a player.

According to the above first preferred example, an easy and intuitive operation, i.e., selecting a character image, enables to exchange a character in the game world for another.

According to the above second preferred example, an easy operation, i.e., selecting a character image, enables a character corresponding to the character image to perform a specific action.

According to the above third preferred example, ability characteristics of a character associated with a character image change according to the size of the character image. Therefore, it is required to make strategies for arranging the character image in consideration of both the size of an area occupied by the character image in the operation panel area and the ability characteristics of the character.

According to the above fourth preferred example, the size of a character image affects ability characteristics of a corresponding character and the number of character images in the operation panel changes a game parameter which affects a difficulty level of a game. Therefore, a dilemma that a large character image cannot be simultaneously arranged in the operation panel area with a large number of character images arises, leading to an increase in a sense of entertainment in the game.

According to the above fifth preferred example, a character image can be easily and intuitively selected by using the touch panel, thereby enhancing controllability.

According to the above sixth preferred example, ability characteristics of a character change through arranging a position of a corresponding character image, thereby increasing a sense of entertainment in the game.

According to the above seventh preferred example, simply arranging the first character image and the second character image in the operation panel area cannot cause a character associated with these character images to appear in the game world. Only when these two character images are combined, the character associated with these character images can appear in the game world, thereby enhancing a sense of entertainment in the game.

According to the above eighth preferred example, it is required to determine whether the total number of characters which can appear in the game world should be increased by arranging a large number of fourth character images in the operation panel area or a focus should be on supporting characters associated with the small number of the fourth character images by arranging, instead of a large number of fourth character images, a large number of fifth character images, and hence enhancing of a sense of entertainment in the game.

According to the above second aspect of the exemplary embodiment, a key image is not only arranged to a position simply easy for operation in the operation panel area, but also assigned with a function as input means, the function being different according to a positional arrangement for the key image. Therefore, a sense of amusement is obtained from designing an arrangement for the key image such that a more advantageous command is assigned thereto.

These and other, features, aspects and advantages of the exemplary embodiment presented herein will become more apparent from the following detailed description of the present invention when taken in conjunction with the accompanying drawings.

BRIEF DESCRIPTION OF THE DRAWINGS

FIG. 4A is an example of a base piece of Character A;
FIG. 4B is an example of a cut piece of Character A and a corresponding support piece;
FIG. 4C is an example of another cut piece of Character A and a corresponding support piece;
FIG. 4D is an example of still another cut piece of Character A and a corresponding battle piece;
FIG. 4E is an example of still another cut piece of Character A and a corresponding battle piece;
FIG. 16 is an example of character piece information;
FIG. 17 is an example of compatibility information;
FIG. 18 is an example of special piece information;
FIG. 19 is an example of operation panel information.

DESCRIPTION OF THE PREFERRED EMBODIMENTS

A configuration and an operation of a game apparatus according to an embodiment will be described below.

Figure 1:
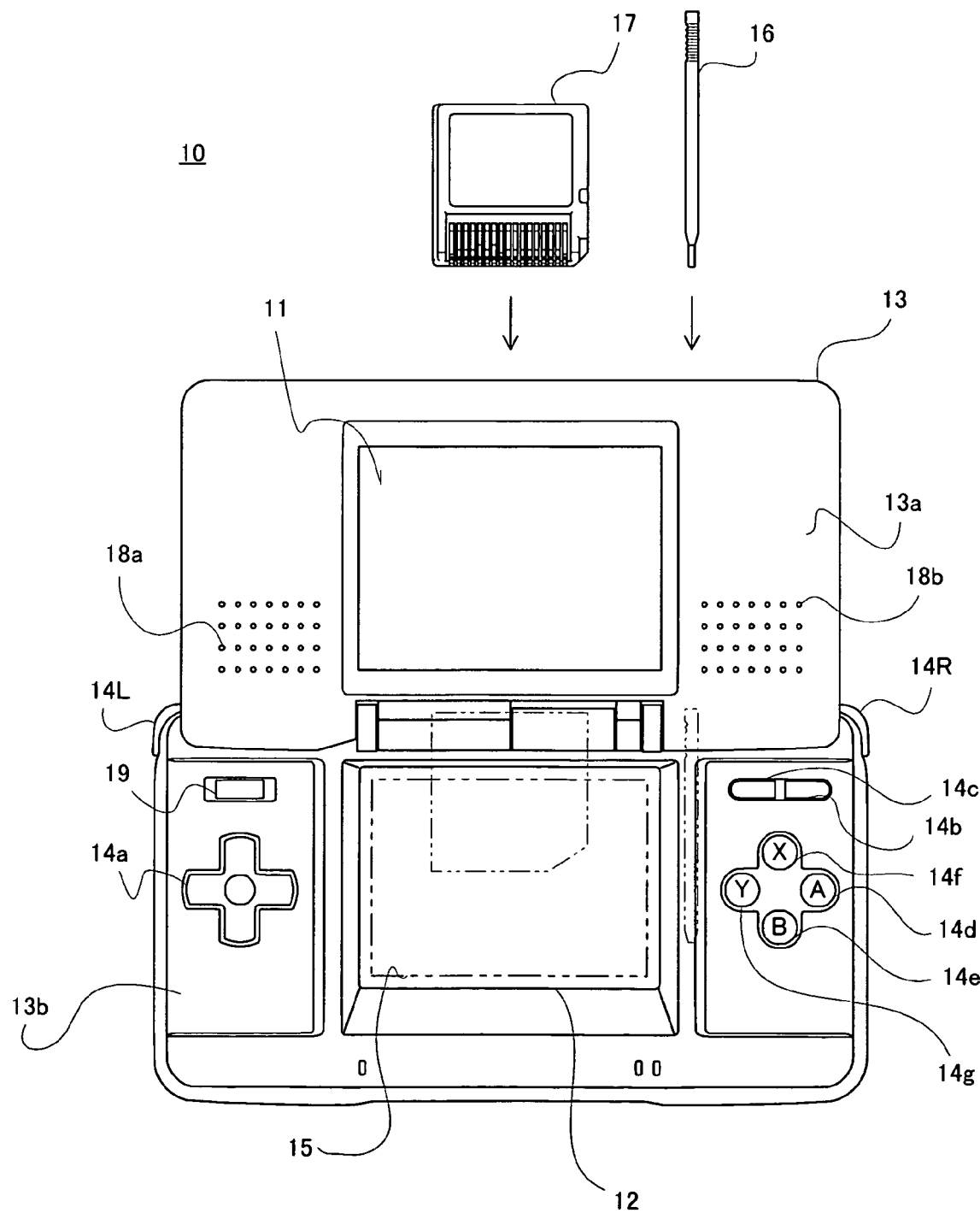
FIG. 1 is a view showing an outer appearance of a game apparatus according to an embodiment.

FIG. 1 is a view showing an outer appearance of the game apparatus according to an embodiment. In FIG. 1, a game apparatus 10 includes a first Liquid Crystal Display (LCD) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that though an LCD is used as a display device in the present embodiment, any other display devices such as a display device using an Electro Luminescence (EL) may be used. Also, the resolution of the display device may be at any level.

The upper housing 13a is provided with sound holes 18a and 18b for outputting sound from a pair of loudspeakers (30a and 30b shown in FIG. 2) to an exterior. A description of the pair of loudspeakers will be provided later.

The lower housing 13b is provided with input devices as follows: a cross switch 14a; a start switch 14b; a select switch 14c; a "A" button 14d; a "B" button 14e; an "X" button 14f; a "Y" button 14g; an "L" button 14L; and an "R" button 14R. In addition, a touch panel 15 is provided on a screen of the second LCD 12 as another input device. The lower housing 13b further includes a power switch 19, and insertion openings for storing a memory card 17 and a stick 16.

The touch panel 15 may be any type such as a resistive film type, an optical type (infrared type), or a capacitive coupling type. The touch panel 15 has a function of outputting, when its surface is touched with the stick 16, coordinate data which corresponds to a touch position. Though the following description is provided on an assumption that the player uses the stick 16 to operate the touch panel 15, of course the touch panel 15 may also be operated with a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and detachably placed in the insertion opening provided to the lower housing 13b.

Next, an internal configuration of the game apparatus 10 will be described with reference to FIG. 2.

Figure 2:
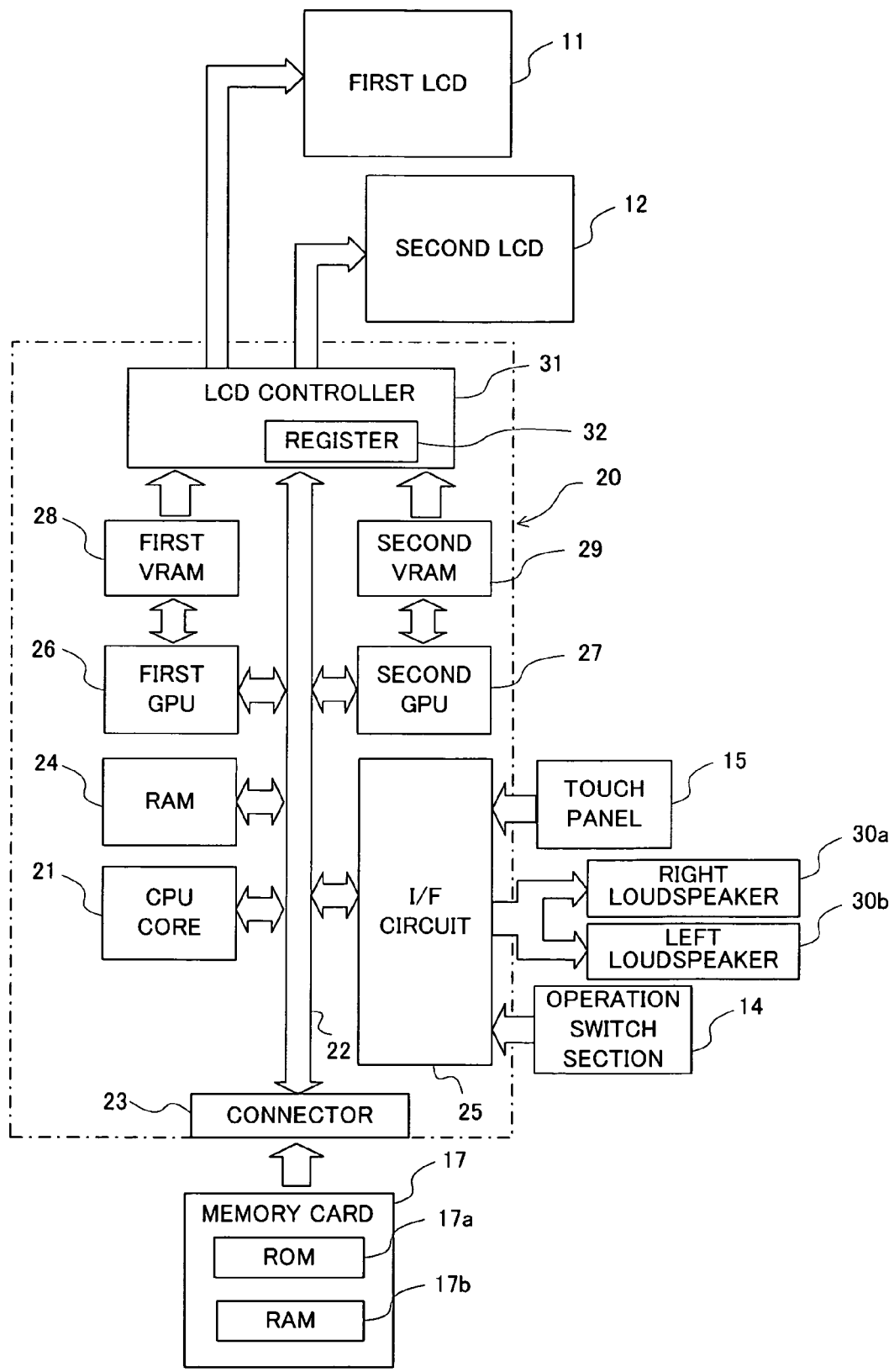
FIG. 2 is an internal configuration of the game apparatus.

In FIG. 2, a CPU core 21 is mounted on an electronic circuit board 20 which is to be housed in the housing 13. Via a bus 22, the CPU core 21 is connected to a connector 23, an input/output interface circuit (shown as an I/F circuit in the diagram) 25, a first Graphics Processing Unit (GPU) 26, a second GPU 27, a RAM 24, and an LCD controller 31. The memory card 17 is detachably connected to the connector 23. The memory card 17 includes a ROM 17a for storing a game program and a RAM 17b for storing back up data in a rewritable manner. The game program stored in the ROM 17a of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, the touch panel 15, the right loudspeaker 30a, the left loudspeaker 30b, and an operation switch section 14, which is comprised of the cross switch 14a, the "A" button 14d, and others, as shown in FIG. 1. The right loudspeaker 30a and the left loudspeaker 30b are arranged inside the sound holes 18a and 18b, respectively.

A first Video RAM (VRAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes image data into the first VRAM 28. The second GPU 27 also follows an instruction from the CPU core 21 to generate a second game image, and writes image data into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the first VRAM 28, and outputs to the second LCD 12 the second game image which has been written into the second VRAM 29. When the value of the register 32 is 1, the first game image which has been written into the first VRAM 28 is outputted to the second LCD 12, and the second game image which has been written into the second VRAM 29 is outputted to the first LCD 11.

Note that the above described configuration of the game apparatus 10 is merely an example. The exemplary embodiment presented herein is applicable to any computer system which comprises at least one display device for displaying a game image and an input device for inputting an instruction from a player. Also, the game program of the exemplary embodiment can be supplied to a computer system not only by the way of an external storage medium such as the memory card 17, but also by the way of a wired or wireless communication path. The program can also be recorded beforehand in a nonvolatile storage inside of a computer system.

Next, with reference to the diagrams, the outline of a game realized with the game apparatus 10 of the present embodiment will be described.

The basic flow of the game is as follows. A player firstly collects "pieces" in a piece collection mode, and an operation panel is generated in an operation panel generation mode by using the collected pieces. Then, the player operates a character in a battle mode by using the generated operation panel.

The piece collection mode is a mode for the player to collect pieces scattered in a game world by operating a character in the game world so that the character explores the game world. Pieces have various types, but they are largely classified into two categories, i.e., character pieces and special pieces. Each of the character pieces corresponds to a character which can appear in the game world in the battle mode. The shape of a character piece is either a square of a predetermined size or a plurality of the squares connected together.

The operation panel generation mode is a mode for generating an operation panel by freely arranging a plurality of pieces having been collected in the piece collection mode in an operation panel area of a predetermined size so as not to overlap each other. A positional arrangement in the operation panel for a piece have an influence upon controllability in a battle mode, ability characteristics of a character operable to a player in the battle mode, and the like. Accordingly, in order to advantageously play in the battle mode, the player has to perform a process of trial and error in consideration of the aforementioned influences.

The battle mode is a mode for performing a battle game by using the operation panel having been generated in the operation panel generation mode. In the battle mode, when the player selects a character piece of a predetermined type (a "battle piece" described later) arranged on the operation panel, a character associated with the selected piece appears in the game world, and whereby the player can perform a battle by operating the character.

Hereinafter, a game flow from the operation panel generation mode to the battle mode is specifically described with reference to exemplary displays of a screen.

Figure 3:
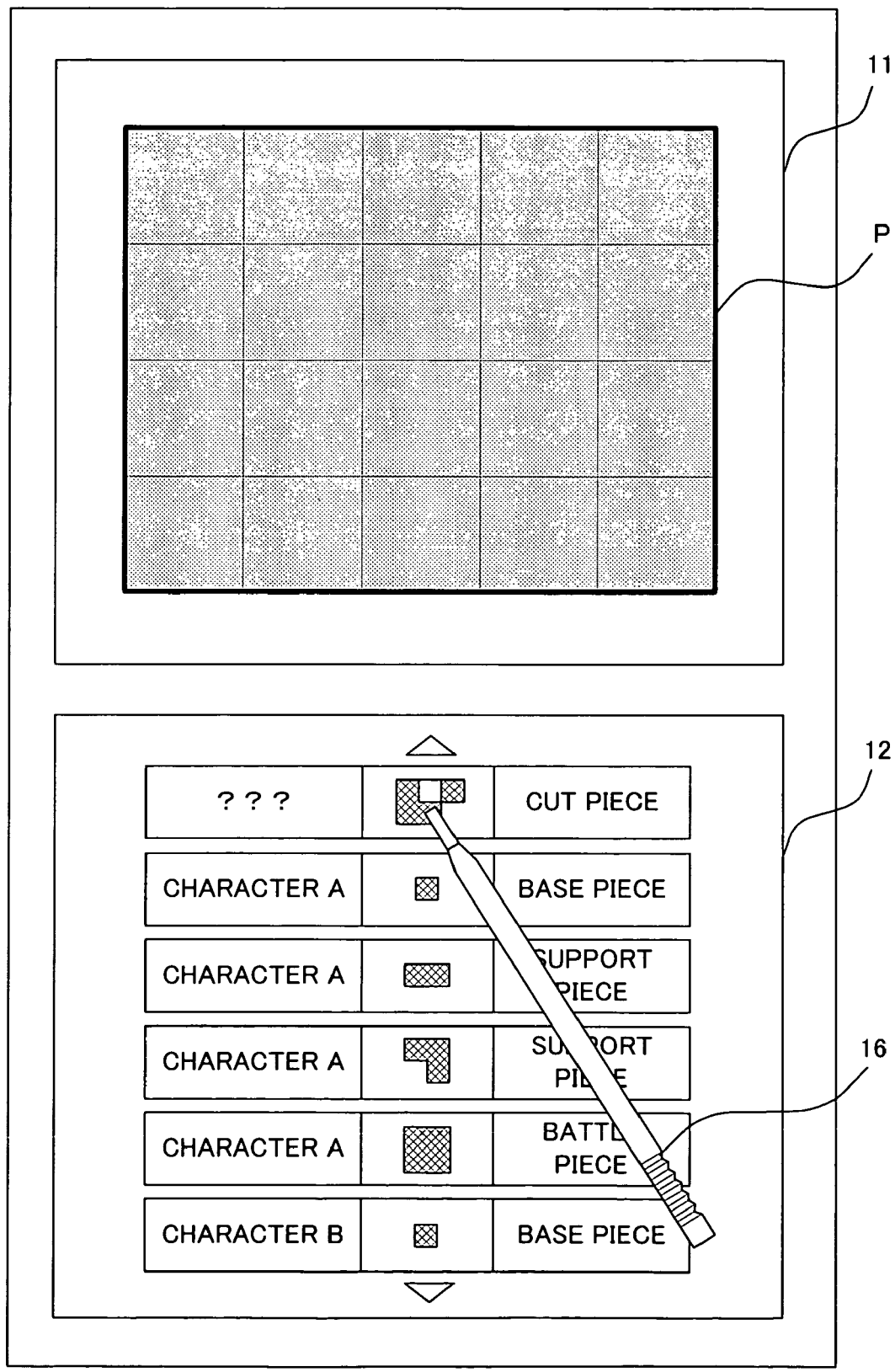
FIG. 3 is an exemplary display for a player to select a piece from a piece list.

FIG. 3 is an exemplary display displayed when the player selects a piece to be arranged in the operation panel area. The first LCD 11 displays an operation panel P which is in process of being generated by the player, and the second LCD 12 displays a list of pieces having been collected in the piece collection mode by the player. If all the pieces having been collected in the piece collection mode by the player cannot be displayed at a time, only a portion of the pieces is displayed and the rest of the pieces are displayed when the player scrolls up or down. The piece list shows a name of a character associated with each of the pieces, a shape of each of the pieces, and a type of each of the pieces.

With reference to FIGS. 4A to 4E, variation in character pieces is described. The character piece is classified into four categories: a base piece; a cut piece; a support piece; and a battle piece.

The base piece is a character piece consisted of one square which is a basic figure for a piece, and shows a face of a character associated therewith. In the following description, the size of a character piece is expressed by a size relative to the size of a base piece which is one. Also, a base piece associated with Character A is referred to as a base piece A1. The "A" of "A1" denotes a character associated with the piece, and "1" denotes the size of the piece.

The cut piece is a piece required to form a support piece or a battle piece. In the operation panel generation mode, a player arranges a cut piece and a base piece both associated with a same character so as to synthesize them into a support piece or a battle piece associated with the character. A cut piece shows a silhouette of a character and the player can estimate a base piece which matches the cut piece based on the silhouette. FIG. 4B shows a cut piece A2 (namely, a cut piece associated with Character A and having the size of two) and a support piece A2 corresponding thereto. FIG. 4C shows a cut piece A3 and a support piece A3 corresponding thereto. FIG. 4D shows a cut piece A4 and a battle piece A4 corresponding thereto. FIG. 4E shows a cut piece A5 and a battle piece A5 corresponding thereto. A method for synthesizing a cut piece with a base piece is described later.

The support piece is a character piece having a shape of two or three squares combined together, as shown in FIG. 4B or 4C. Each of the squares is the basic figure for a piece.

The battle piece is a character piece having a shape of four or more squares combined together, as shown in FIG. 4D or 4E. Each of the squares is the basic figure for a piece.

When the player selects a cut piece displayed at the top of the piece list with the stick 16 in FIG. 3, display contents (namely, the operation panel P) of the first LCD 11 switches the position with display contents (namely, the piece list) of the second LCD 12, and the second LCD 12 displays the operation panel P under editing which shows the cut piece having been selected by the player being temporarily arranged at an initial position. The player can move the cut piece to an arbitrary position in the operation panel P by dragging (sliding while keeping a touch on the cut piece) the temporarily arranged cut piece with the stick 16.

Figure 5:
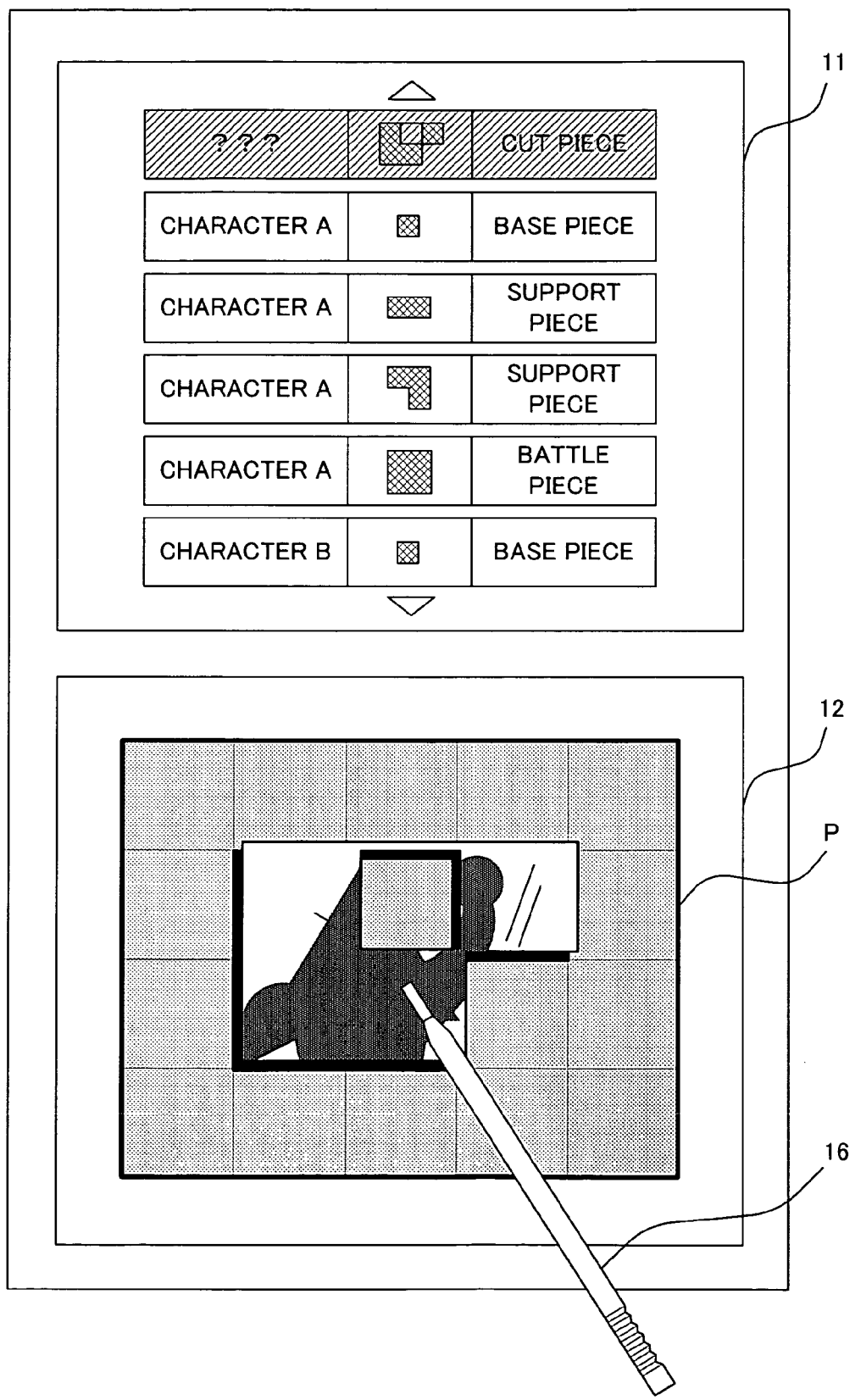
FIG. 5 is an exemplary display displayed when the player arranges a piece in an operation panel.
Figure 6:
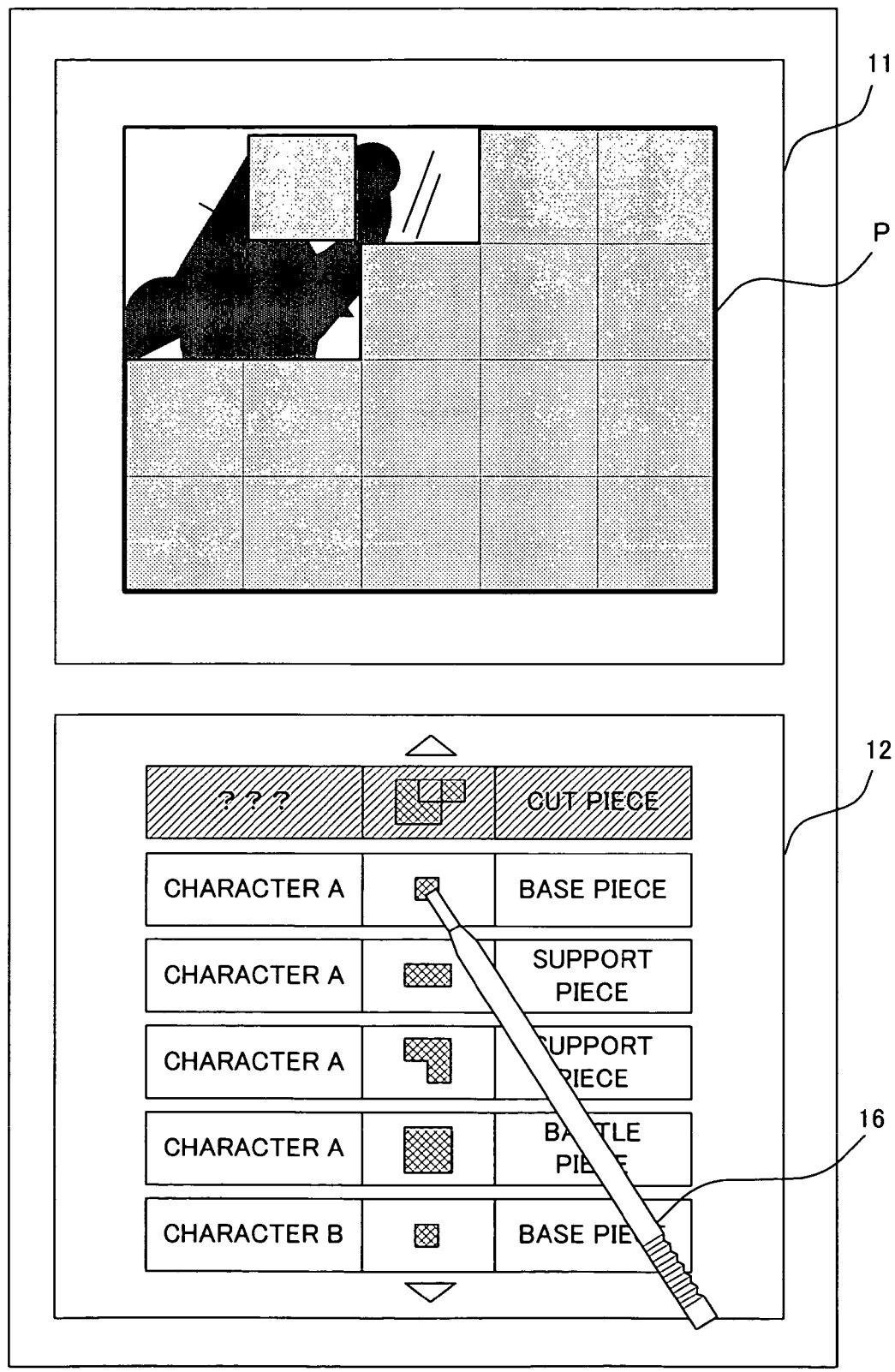
FIG. 6 is another exemplary display displayed when the player selects a piece from a piece list.

When, in FIG. 5, the player moves the cut piece to the upper left corner of the operation panel P and then performs a determination operation (e.g., tapping the cut piece with the stick 16, in other words, briefly touching the cut piece), the display contents (namely, the operation panel P) of the second LCD 12 switches the position back with the display contents (namely, the piece list) of the first LCD 11, as shown in FIG. 6. By repeatedly performing the above operation, the player can sequentially arrange desired pieces to desired positions in the operation panel P. However, character pieces (except cut pieces) associated with a same character cannot be plurally arranged on the operation panel P. Also, in order to use the generated operation panel P in the battle mode, at least one battle piece has to be arranged on the operation panel P.

Figure 7:
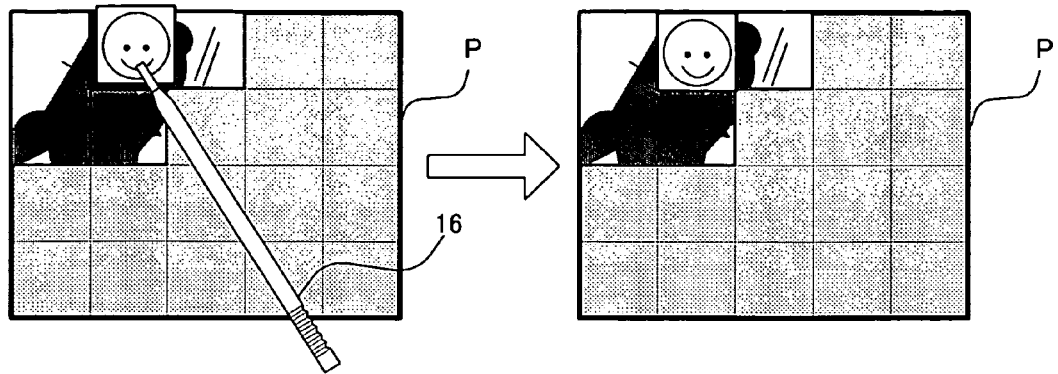
FIG. 7 is an exemplary display displayed when a base piece of a character different from Character A is arranged so as to superimpose on a cut out portion of a cut piece of Character A.
Figure 8:
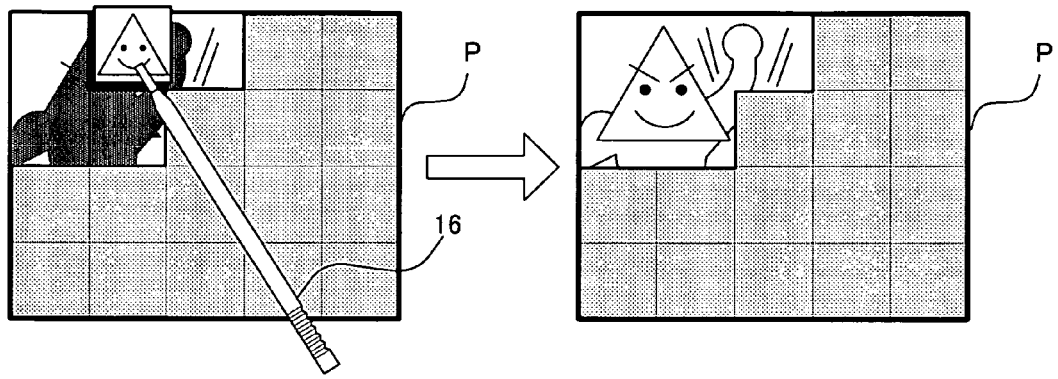
FIG. 8 is an exemplary display displayed when a base piece of Character A is arranged so as to superimpose on a cut out portion of a cut piece of Character A.

Basically, though a plurality of pieces cannot be arranged on the operation panel so as to overlap each other, a piece can be arranged so as to overlap with another piece if the piece is to be arranged on a cut out portion of a cut piece. FIG. 7 shows an exemplary display displayed when a base piece D1 is superimposed on a cut piece A5. Note that, when a base piece associated with a character same as that for a cut piece is arranged on the cut out portion of the cut piece, the cut piece and the base piece are synthesized as described above, transforming these pieces into a support piece or a battle piece. FIG. 8 shows an exemplary display displayed when the base piece A1 is superimposed on the cut piece A5 Superimposing the base piece A1 on the cut piece A5 results in a synthesis of these pieces so as to become a battle piece A5 and the battle piece A5 is arranged on the operation panel P. Note that if it is a support piece or a battle piece, a character can appear or be supported in the game world through selecting the piece in the battle mode. However, when pieces are arranged as shown in FIG. 7, selecting the pieces in the battle mode does not affect the game world. Therefore, arranging pieces as shown in FIG. 7 has no advantages and should be avoided since it is a waste of a limited area of the operation panel which is a 4×5 grid.

Figure 9:
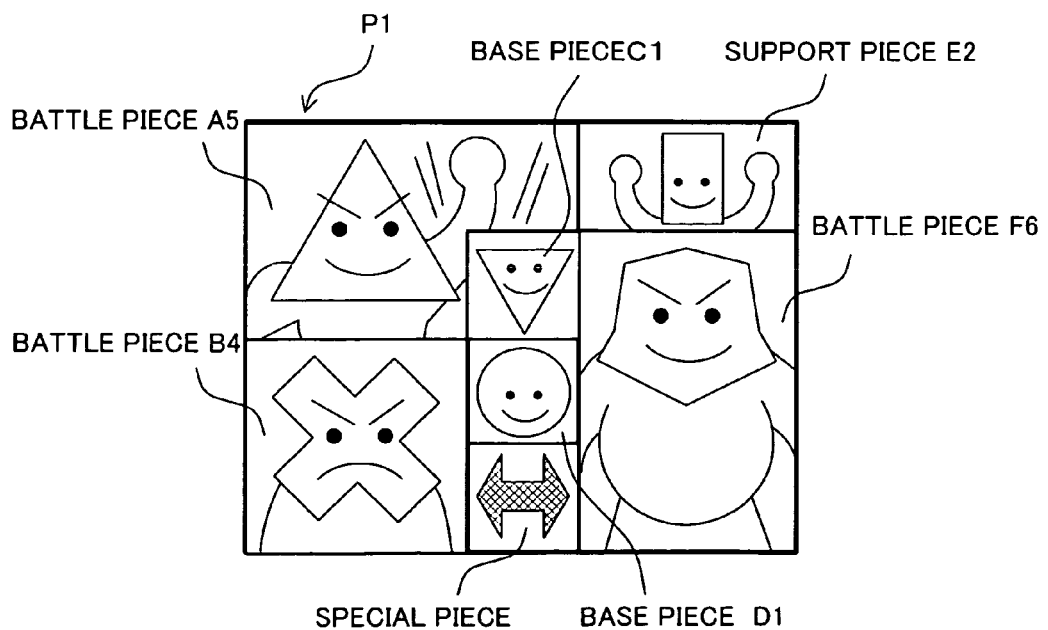
FIG. 9 is an example of an operation panel generated by the player.

FIG. 9 shows an example of an operation panel generated in the operation panel generation mode. In an operation panel P1 arranged are one special piece and six character pieces, i.e., the battle piece A5, a battle piece B4, a base piece C1, the base piece D1, a support piece E2, and a battle piece F6. A detail of a special piece is described later.

Next, an outline of the battle mode is described.

Figure 10:
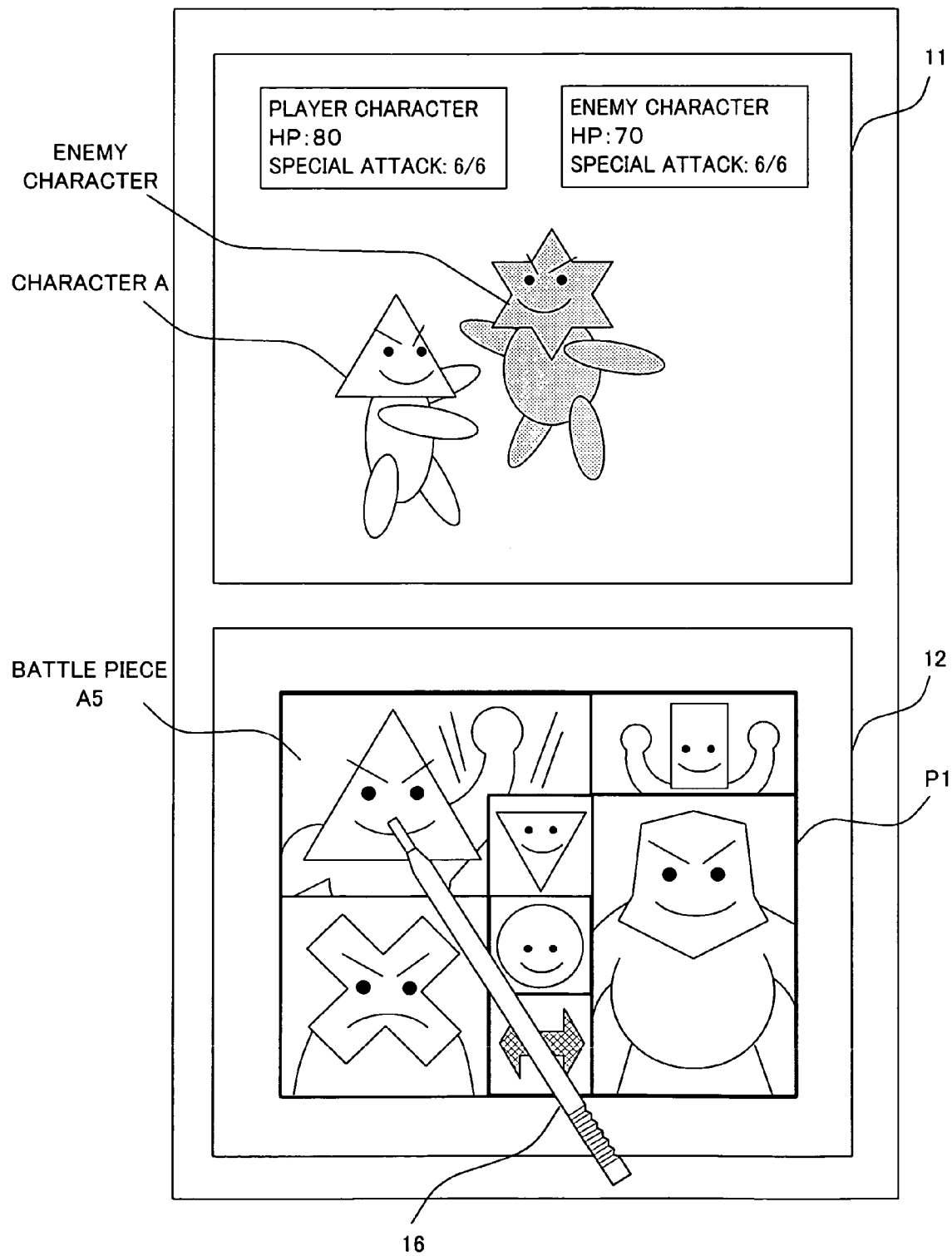
FIG. 10 is an exemplary display for a battle mode.

When the battle mode is started, a game world is displayed on the first LCD 11 and the operation panel P1 is displayed on the second LCD 12 as shown in FIG. 10. The player taps, with the stick 16, on a desired battle piece from among battle pieces included in the operation panel P1 so that a character associated with the battle piece appears in the game world for the player to operate so as to play the game. In an example of FIG. 10, the battle piece A5 is selected by the player, causing Character A associated with the battle piece A5 to appear in the game world so as to start a fight against an enemy character. The player can control an action of Character A by operating the operation switch section 14. When Character A is in the game world, further tapping on the battle piece A5 with the stick 16 can cause Character A to perform a predetermined action (e.g., punching upward).

In FIG. 10, in addition to a state of the game world, the first LCD 11 displays, for a player character and an enemy character, information including hit points (HP), the number of special attacks left for use, and the maximum number of special attacks for use. The "HP" is the amount of damage which the character can withstand. The value of HP is reduced when a character having the HP receives an attack, and, when the HP becomes zero, the character is regarded as being knocked out.

Figure 11:
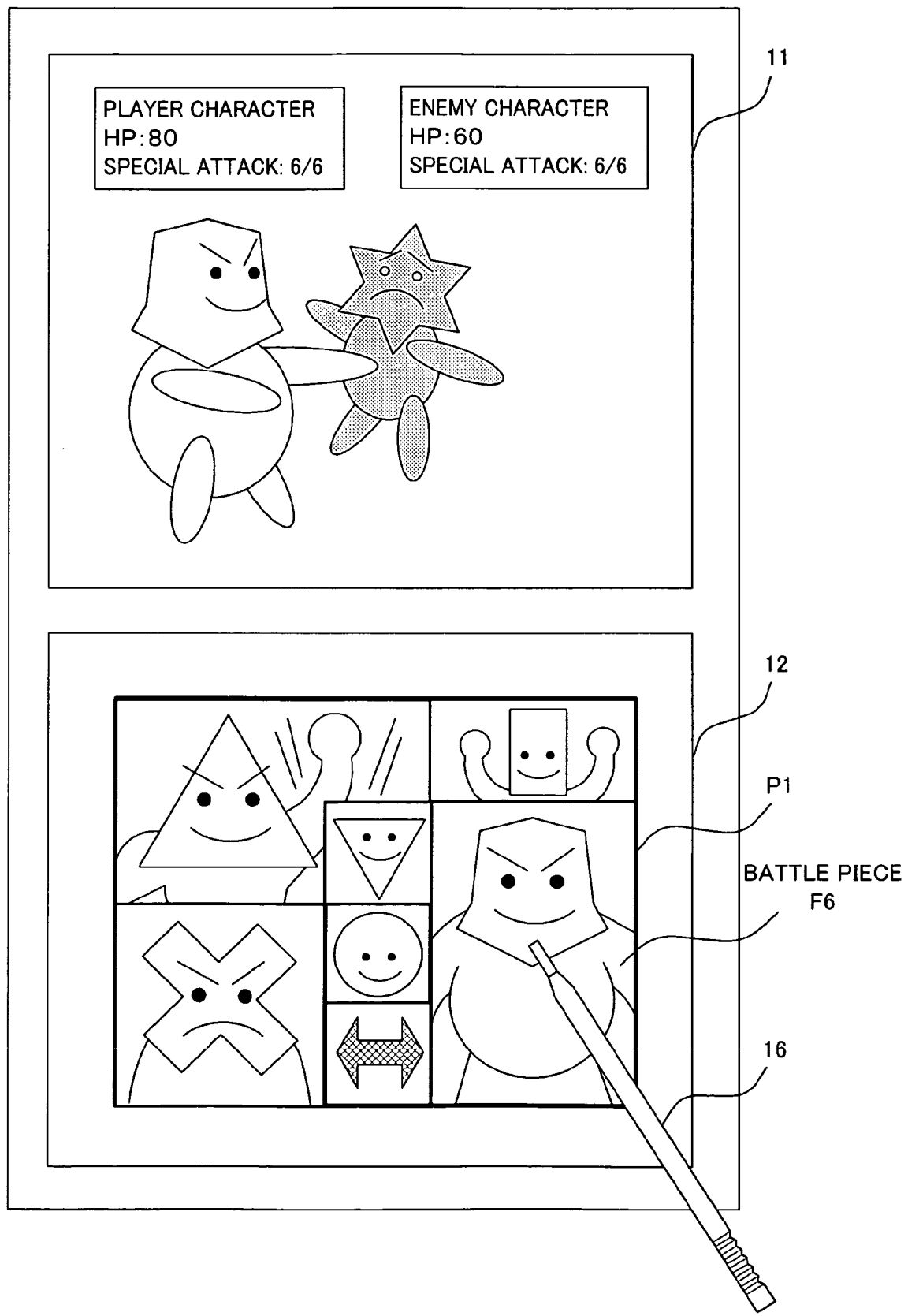
FIG. 11 is an exemplary display displayed when the player selects a battle piece in the battle mode.

When the player taps a battle piece associated with character different from Character A while Character A is in the game world as shown in FIG. 10, Character A in the game world is changed to a character associated with the tapped battle piece, and the character associated with the tapped battle piece appears in the game world. For example, when the player taps on the battle piece F6 while Character A is in the game world as shown in FIG. 10, Character F appears in the game world replacing Character A, as shown in FIG. 11. Here, if an enemy character exists within a close range for the player character, the player character attacks the enemy character simultaneous to the replacement. With this mechanism, the player can successively attack the enemy character by swiftly and sequentially tapping a battle piece on the operation panel P1.

Figure 12:
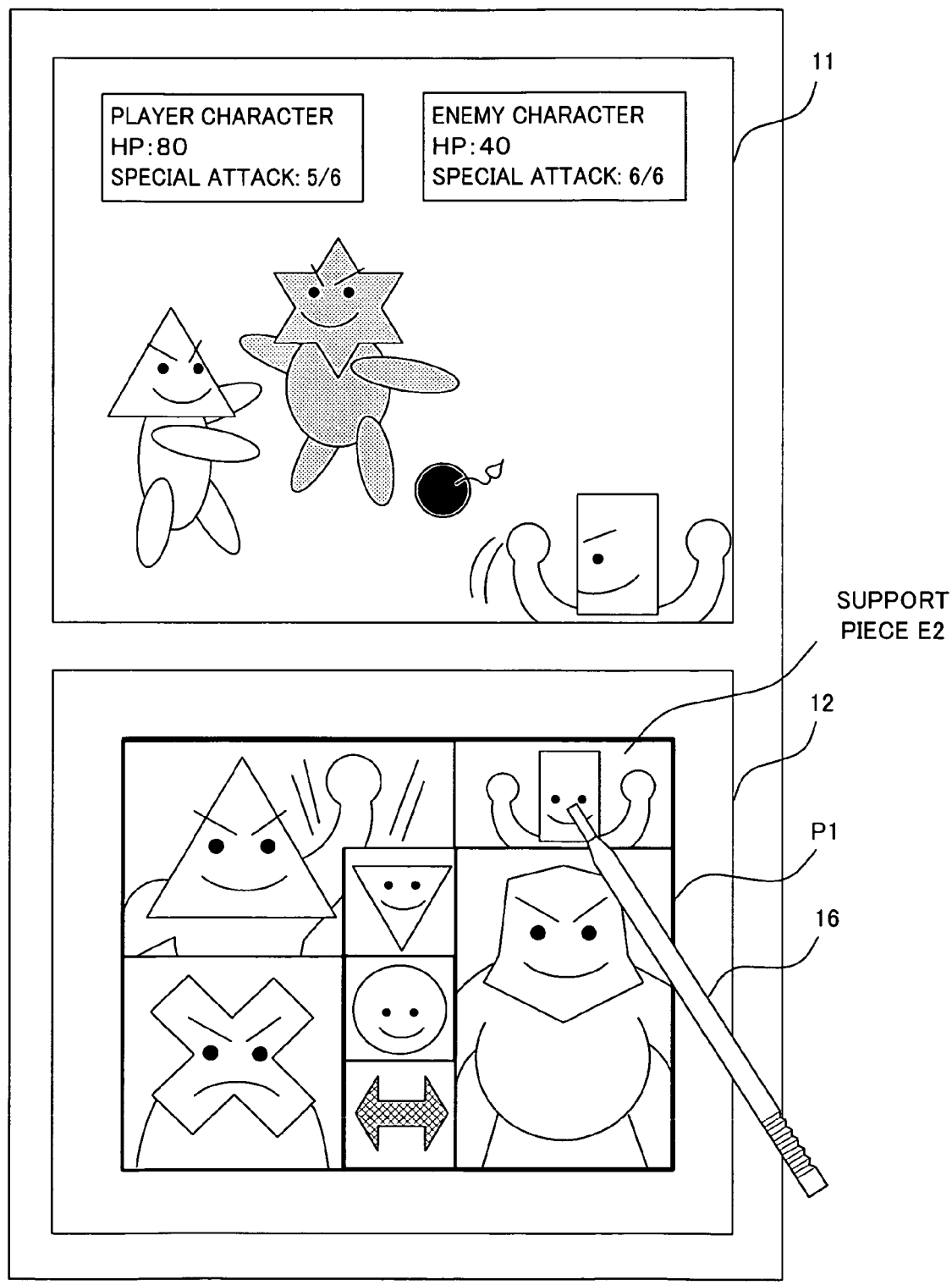
FIG. 12 is an exemplary display displayed when the player selects a support piece in the battle mode.

When the player taps on a support piece on the operation panel P1 in the battle mode, it causes a support event to occur. In the support event, a character associated with the support piece supports the player character in a fight in the game world. For example, when the player taps on the support piece E2 while Character A is in the game world as shown in FIG. 10, Character E throws a bomb toward the enemy character as shown in FIG. 12. Other examples of support events are: recovering HP of a player character; temporarily enhancing attack power of a player character; and the like. When a support event is caused, the number of special attacks left for player characters to use is reduced by one. In the example of FIG. 12, the number of special attacks left for player characters to use is reduced to five as a result of having a support event with the support piece E2.

Figure 13:
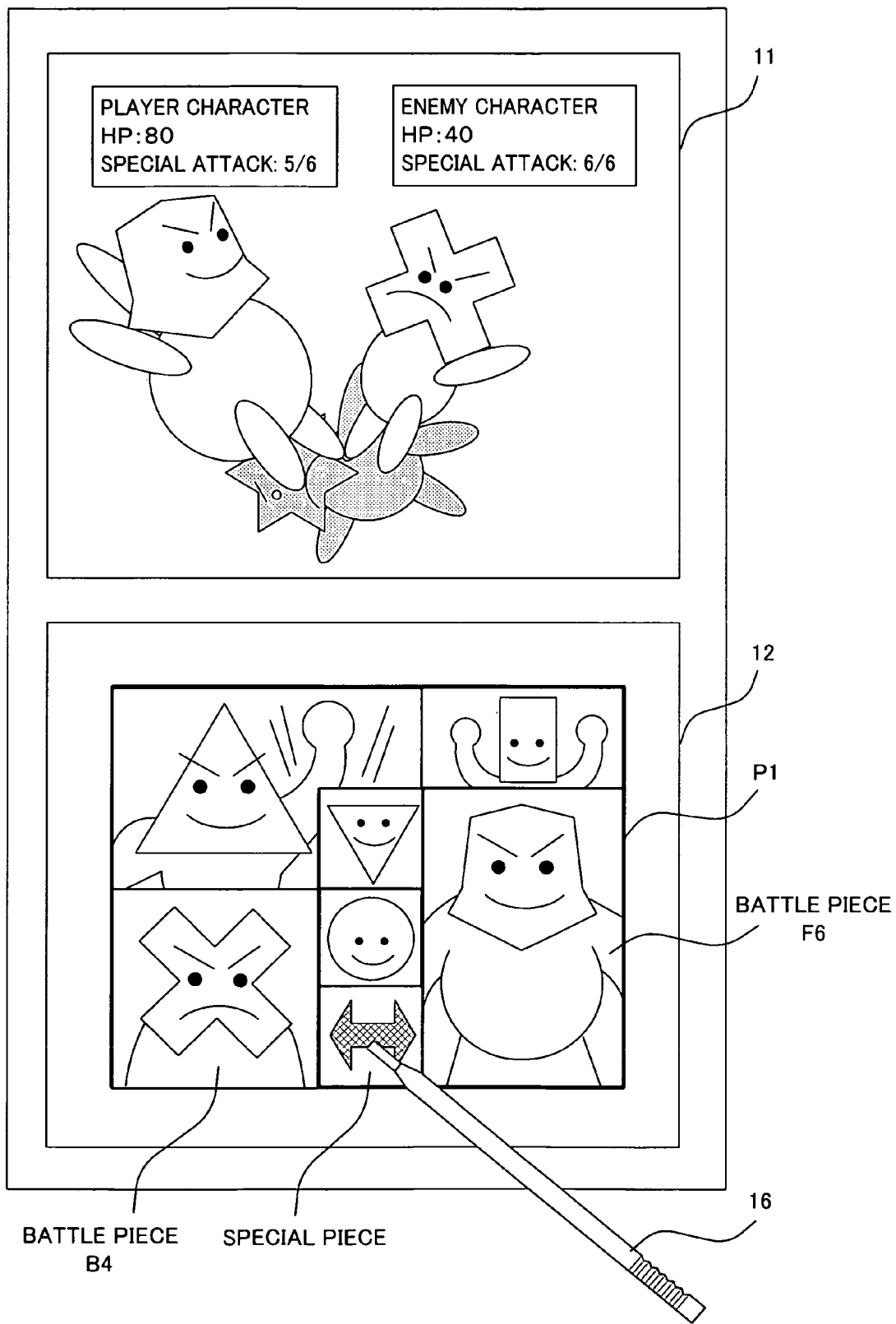
FIG. 13 is an exemplary display displayed when the player selects a special piece in the battle mode.
Figure 14:
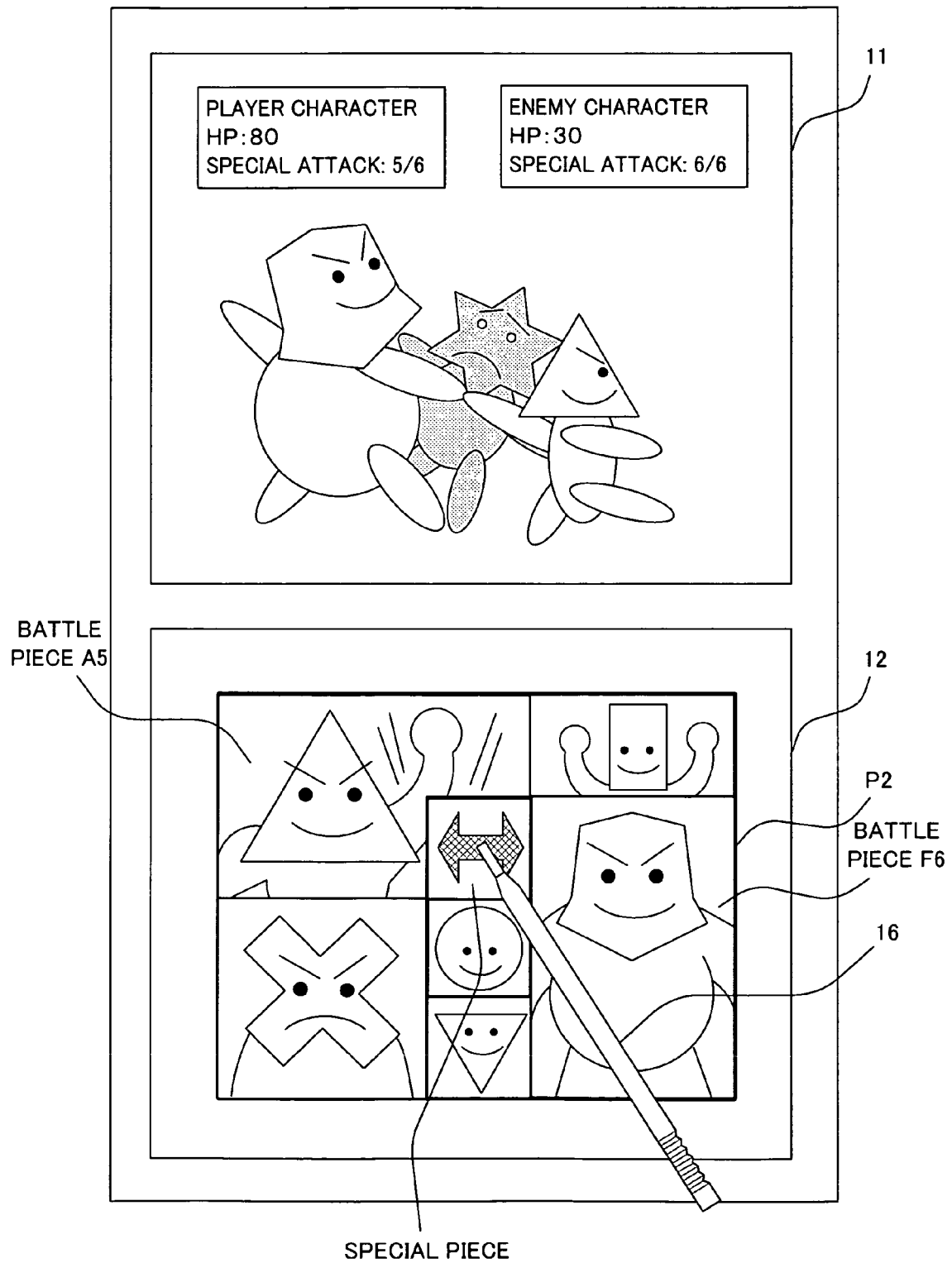
FIG. 14 is another exemplary display displayed when the player selects a special piece in the battle mode.

When the player taps on a special piece on the operation panel P1 in the battle mode, it causes an event which differs according to conditions in arrangement for the special piece to occur. For example, consider a case of using, in the battle mode, the operation panel P1 of FIG. 9. When the player taps on the special piece on the operation panel P1 Character B associated with a battle piece arranged on the left side of the special piece and Character F associated with a battle piece arranged on the right side of the special piece together temporarily appear in the game world, and a collaborated special attack by these characters is caused, as shown in FIG. 13. In a case of using, in the battle mode, an operation panel P2 of FIG. 14, when the player taps on the special piece on the operation panel P2, Character A associated with a battle piece arranged on the left side of the special piece and Character F associated with a battle piece arranged on the right side of the special piece together temporarily appear in the game world, and a collaborated special attack by these characters is caused. If a battle piece is arranged on either one of the left or right side of a special piece, tapping on the special piece causes a single special attack by a character associated with the battle piece. If a battle piece is arranged neither on the left nor right side of a special piece, tapping on the special piece does not cause anything. As such, functions of the special piece as a key are changed in accordance with a type of a piece arranged next thereto.

Next, an operation of a game apparatus executing a game such as above is described in more detail.

Figure 15:
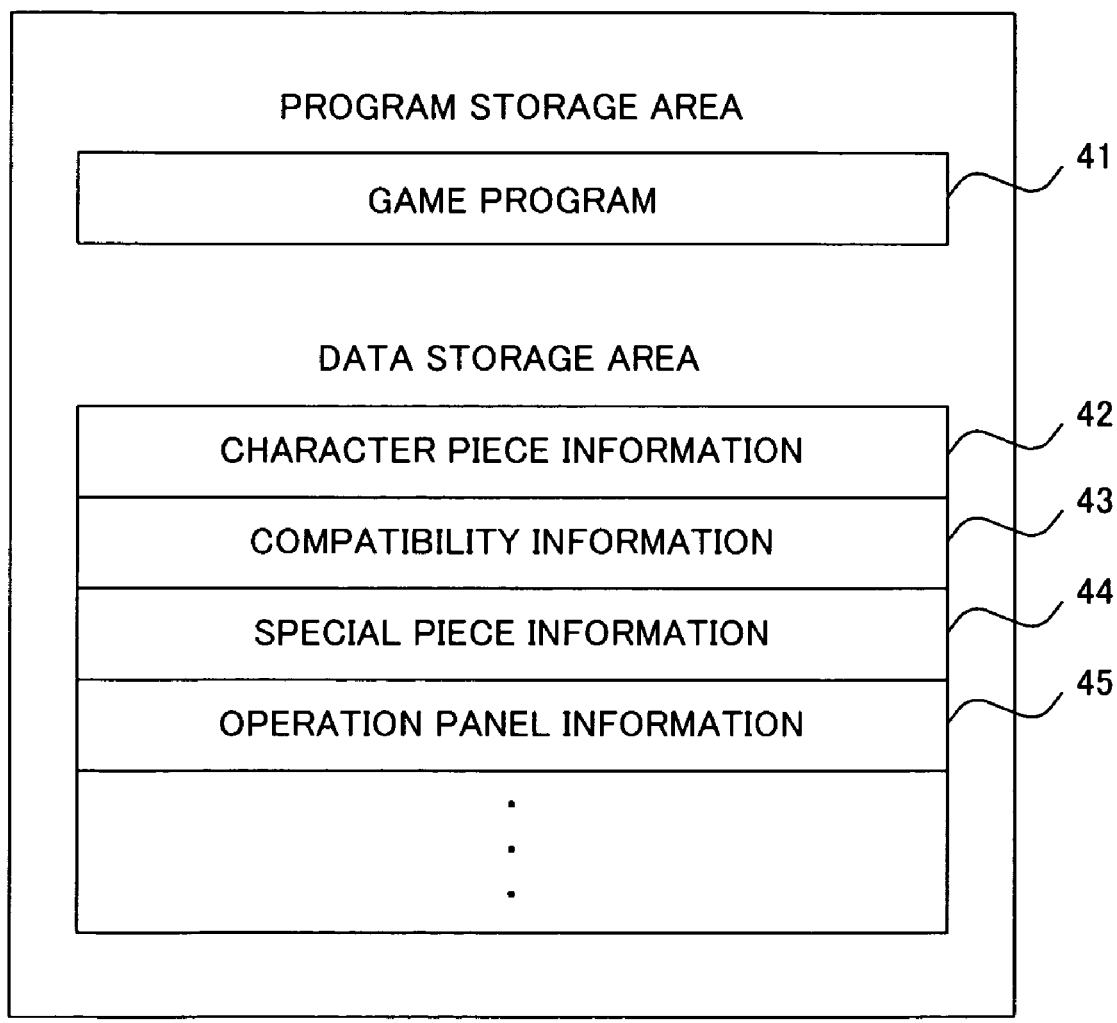
FIG. 15 is a memory map of a RAM 24.

FIG. 15 shows a memory map of the RAM 24. The RAM 24 stores a game program 41, character piece information 42, compatibility information 43, special piece information 44, operation panel information 45, and other information 46.

The game program 41 is a program for causing the CPU core 21 to execute a game process, and loaded from the ROM 17a to the RAM 24 previous to the execution of the game process.

The character piece information 42 is information for various character pieces. FIG. 16 shows an example of the character piece information 42. In FIG. 16, "primary ability characteristics" is ability characteristics which are basic to a character when determining ability characteristics of the character. Final ability characteristics of the character is determined by changing the primary ability characteristics thereof in accordance with an arrangement of pieces in the operation panel. Note that, in the example of FIG. 16, although an "HP", an "attack power", and a "special attack" are defined for primary ability characteristics, other ability characteristics may be defined. As FIG. 16 clearly shows, the primary ability characteristics change not only with respect to each character but also in accordance with the size of a battle piece. Basically, the bigger a battle piece is, the more advantageous primary ability characteristics are assigned thereto. "Functions as a key" indicates a function to be performed by a piece when the player selects (taps on) the piece in the battle mode. For example, consider using of the battle piece A4 When the battle piece A4 is tapped while Character A is not in the game world, a change of characters is caused, and, when the battle piece A4 is tapped while Character A is in the game world, a regular attack X is caused. "Acquisition flag" indicates whether or not apiece is obtained in the piece collection mode or obtained through synthesis by the player, and is referred to when a piece list is generated, for example.

The compatibility information 43 is information for defining a compatibility of each character. FIG. 17 shows an example of the compatibility information 43. In the example of FIG. 17, (a battle piece of) Character A is defined such that, when arranged adjacent to a character piece (base piece, support piece, battle piece) of Character C, the upper limit of HP thereof is increased by ten. Accordingly, when the battle piece A5 and the base piece C1 are arranged so as to be adjacent to each other in the operation panel as shown in FIG. 10, ten is added to the HP value, i.e., seventy, defined based on the primary ability characteristics thereof, so that the upper limit of HP of Character A becomes eighty. Note that such a redefining effect cannot be obtained for the operation panel P2 of FIG. 14, and therefore, the HP value, i.e., seventy, defined based on the primary ability characteristics is employed as the upper limit of HP of Character A. Also, in FIG. 17, Character F is defined such that, when at least one character piece of a female character is arranged on the operation panel, the attack power thereof is increased by the number of female character pieces times 10%. In such a case, the attack power of Character F is increased even when a character piece of a female character is not adjacent to the battle piece of Character F. Whether a character is male or female is defined in the character piece information 42.

The special piece information 44 is information for defining a function of a special piece as a key (a function to be performed by a piece when the piece is tapped in the battle mode). FIG. 18 shows an example of the special piece information 44. In the example of FIG. 18, when a special piece is arranged between a battle piece A and a battle piece F, the special piece is defined such that it functions as a key to cause a collaborated special attack AF (see FIG. 14). Also, when the special piece is arranged between a battle piece B and the battle piece F, the special piece functions as a key to cause a collaborated special attack BF (see FIG. 13). When a battle piece is arranged either one of left or right side of the special piece, the special piece functions as a key to cause a single special attack by a character associated with the battle piece. When any of the above arrangement conditions are not satisfied, no event occurs even when the player taps on the special piece.

The operation panel information 45 is information regarding one or a plurality of operation panels generated by the player. FIG. 19 shows an example of the operation panel information 45. The operation panel information 45 includes, with respect to each operation panel generated by the player, positional arrangement information, the maximum number of special attacks for use, and ability characteristics information for each piece. As the maximum number of special attacks for use, a value same as the number of character pieces arranged on the operation panel is obtained. As the ability characteristics information, obtained with respect to each battle piece arranged in the operation panel is final ability characteristics of a character, namely, ability characteristics obtained as a result of redefining primary ability characteristics based on the compatibility information 43 or the like. With the final ability characteristics, a game process is executed in the battle mode.

Figure 20:
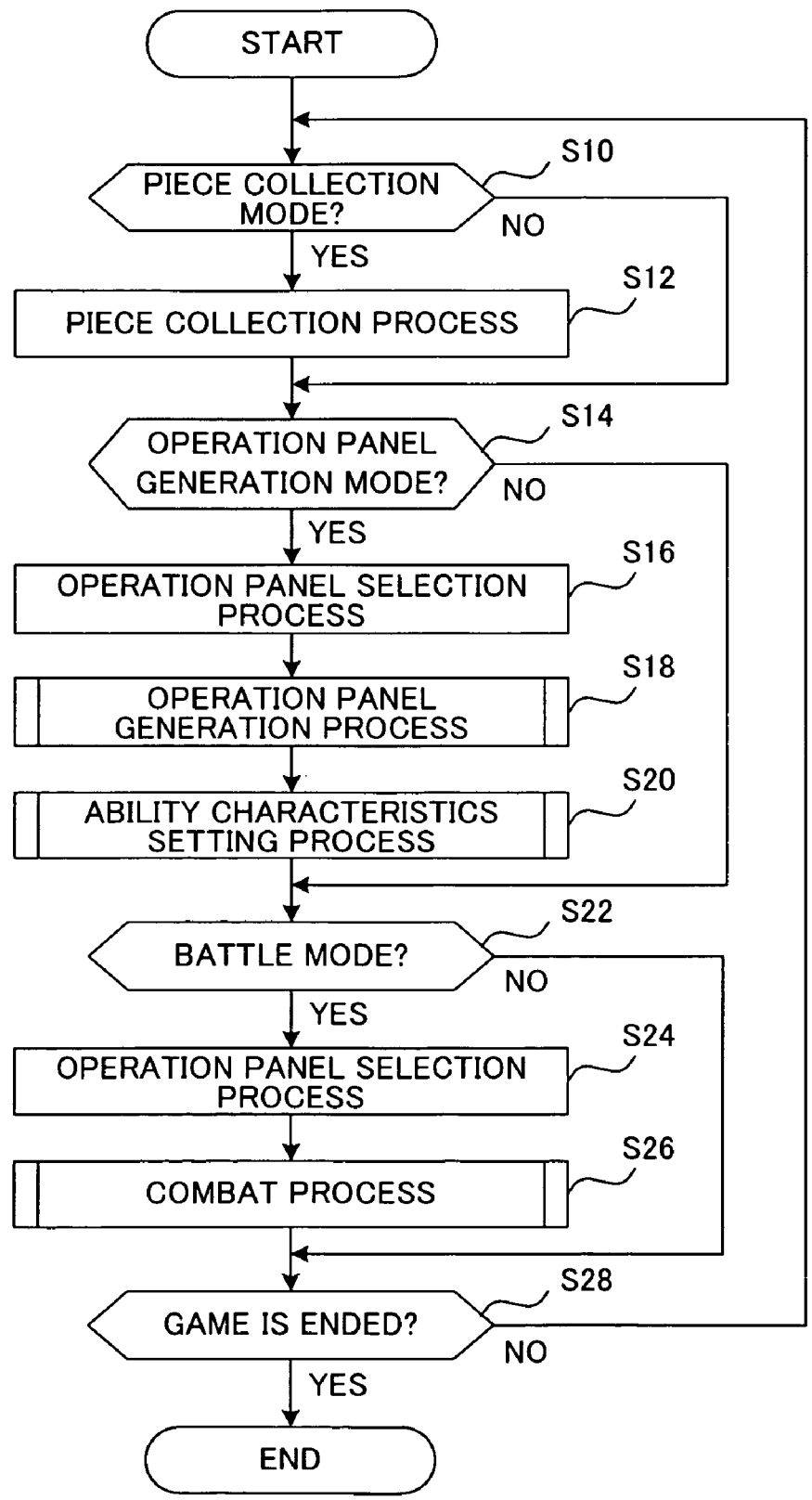
FIG. 20 is a flowchart showing a process flow based on a game program.

Next, with reference to a flowchart of FIG. 20, a process flow of the CPU core 21 based on the game program 41 is described.

In step S10, it is determined whether or not the piece collection mode is selected by the player. If the piece collection mode is selected, the process proceeds to step S12, and, if the piece collection mode is not selected, the process proceeds to step S14.

In step S12, a piece collection process is executed. Specifically, a character in the game world is controlled so as to move based on an operation of the player, and, when the player finds a piece, the acquisition flag corresponding to the piece is turned "on".

In step S14, it is determined whether or not the operation panel generation mode is selected by the player. If the operation panel generation mode is selected, the process proceeds to step S16, and, if the operation panel generation mode is not selected, the process proceeds to step S22.

In step S16, from among operation panels retained in the operation panel information 45, the player is caused to select an operation panel to edit. Note that, if an operation panel is not yet generated or under editing by the player, an operation panel in which no piece is arranged is newly generated as a panel to be edited.

In step S18, an operation panel generation process is performed. Hereinafter, a detail of the operation panel generation process is described referring to a flowchart of FIG. 21.

(Operation Panel Generation Process)

Figure 21:
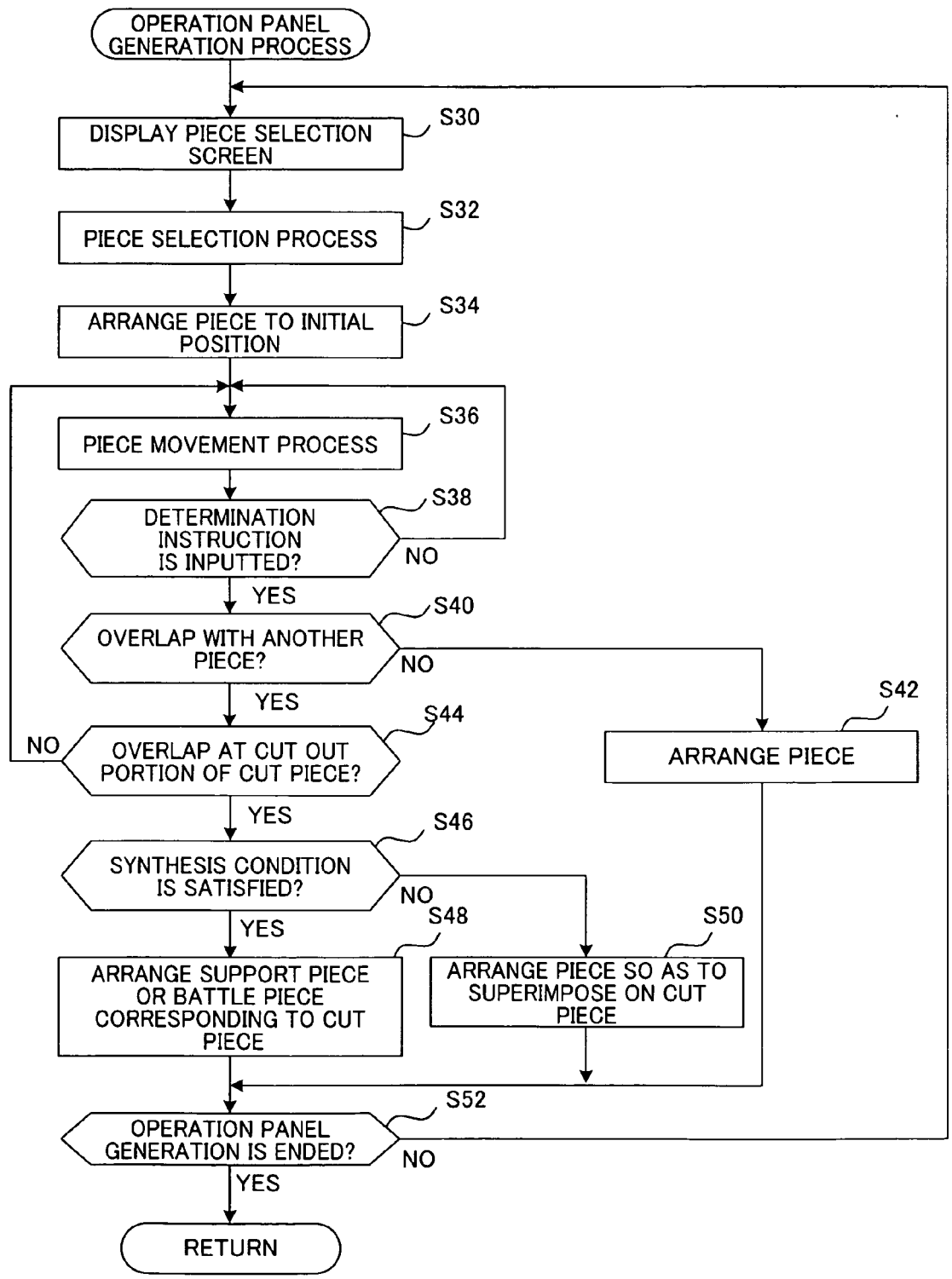
FIG. 21 is a flowchart showing a flow for an operation panel generation process.

In step S30 of FIG. 21, an operation panel to be edited is displayed on the first LCD 11 as shown in FIG. 3, and a list for collected pieces is displayed on the second LCD 12.

In step S32, a piece selected by the player is detected based on a signal from the touch panel 15. Note that the piece selected by the player may be detected based on a signal from the operation switch section 14.

In step S34, display contents of the first LCD 11 switches the position with that of the second LCD 12 as shown in FIG. 5, and the piece selected in step S32 by the player is temporarily arranged to an initial position (e.g., a center of the operation panel) in the operation panel.

In step S36, the position of the temporarily arranged piece is moved based on a drag operation on the touch panel 15 performed by the player. Note that the position of the temporarily arranged piece may be moved based on a signal from the operation switch section 14.

In step S38, it is determined whether or not a determination instruction is inputted by the player based on a signal from the touch panel 15. If the determination instruction is not inputted, the process returns to step S36, and, if the determination instruction is inputted, the process proceeds to step S40. Note that whether or not the determination instruction is inputted by the player may be determined based on a signal from the operation switch section 14.

In step S40, with reference to the positional arrangement information for each piece, in the operation panel information 45, which shows a position of each piece arranged on the operation panel under editing, it is determined whether or not the temporarily arranged piece overlaps with another piece. If the temporarily arranged piece overlaps with another piece, the process proceeds to step S44, and, if not, the process proceeds to step S42.

In step S42, the temporarily arranged piece is arranged to a current position, and the positional arrangement information for each piece, in the operation panel information 45, which shows a position of each piece arranged on the operation panel under editing is updated.

In step S44, it is determined whether or not the temporarily arranged piece overlaps at a cut out portion of a cut piece. If the piece overlaps at the cut out portion of the cut piece, the process proceeds to step S46, and, if the piece does not overlap at the cut out portion of the cut piece, the process returns to step S36.

In step S46, it is determined whether or not a synthesis condition is satisfied between the temporarily arranged piece and the cut piece overlapping with the temporarily arranged piece. In other words, it is determined whether or not these two pieces are associated with a same character. If the synthesis condition is satisfied, the process proceeds to step S48, and, if not, the process proceeds to step S50.

In step S48, a support piece or a battle piece corresponding to the cut piece is arranged as shown in FIG. 8, and the positional arrangement information for each piece, in the operation panel information 45, which shows a position of each piece arranged on the operation panel under editing is updated.

In step S50, the temporarily arranged piece is arranged so as to superimpose on the cut piece as shown in FIG. 7, and the positional arrangement information for each piece, in the operation panel information 45, which shows a position of each piece arranged on the operation panel under editing is updated.

In step S52, it is determined whether or not an instruction to end the operation panel generation process is inputted by the player. If an instruction to end is inputted, the operation panel generation process is ended, and, if an instruction to end is not inputted, the process returns to step S30.

After the completion of the operation panel generation process, an ability characteristics setting process is performed in the following step S20. Hereinafter, with reference to a flowchart of FIG. 22, a detail of the ability characteristics setting process is described.

(Ability Characteristics Setting Process)

Figure 22:
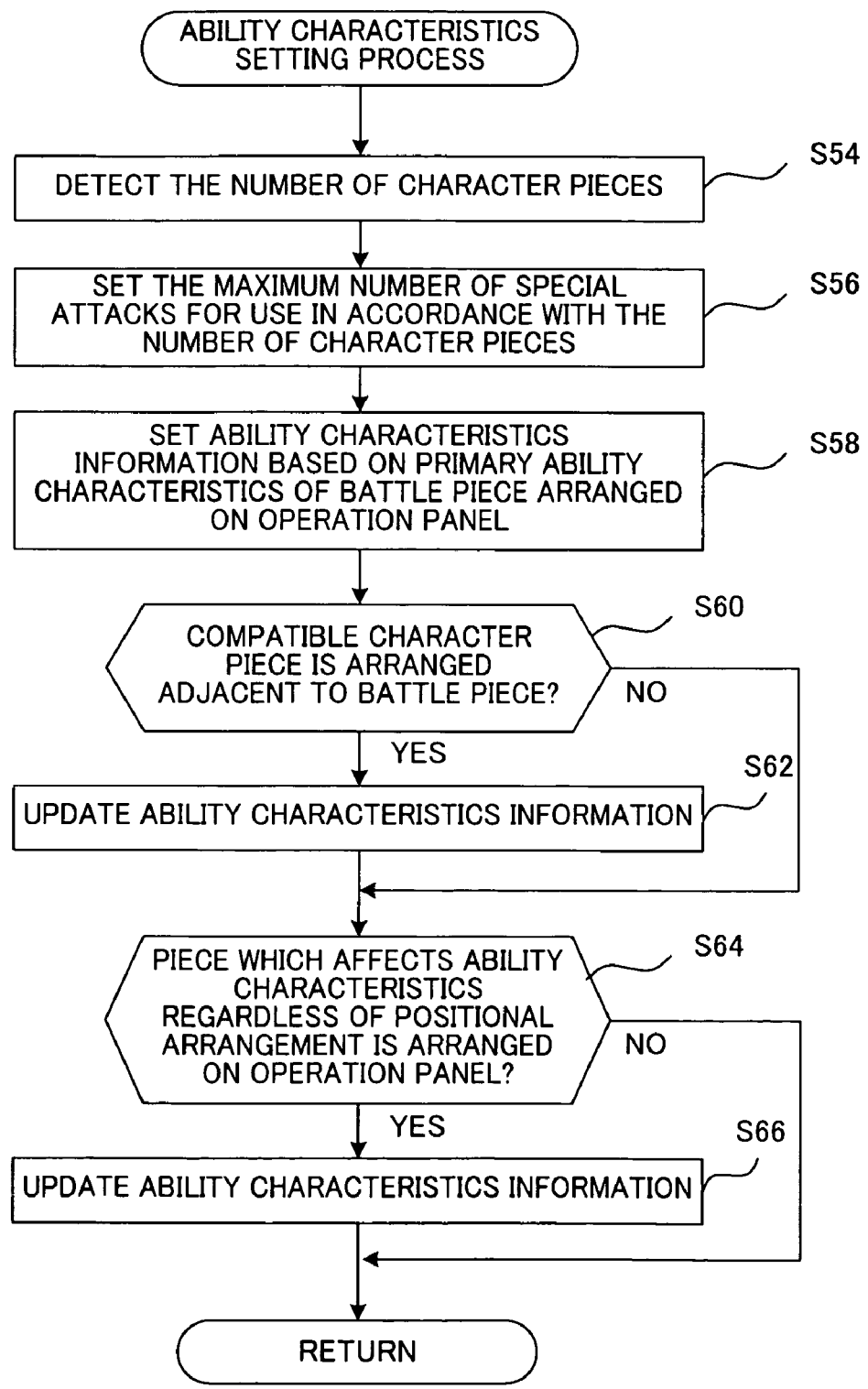
FIG. 22 is a flowchart showing a flow for an ability characteristics setting process.

In step S54 of FIG. 22, the total number of character pieces arranged in the operation panel generated in step S18 is detected.

In step S56, the maximum number of special attacks for use is determined in accordance with the total number of character pieces detected in step S54, and the operation panel information 45 is updated.

In step S58, the ability characteristics information in the operation panel information 45 is updated based on the primary ability characteristics in the character piece information 42.

In step S60, with reference to the compatibility information 43, it is determined, for each battle piece arranged on the operation panel, whether or not a character piece compatible there with is arranged so as to be adjacent thereto. If there exists a character piece compatible with a battle piece being so arranged that the character piece is adjacent to the battle piece, ability characteristics information, in the operation panel information 45, corresponding to the battle piece is updated based on the compatibility information 43 (S62).

In step S64, with reference to the compatibility information 43, it is determined whether or not a piece which affects ability characteristics of a character regardless of its positional arrangement is arranged on the operation panel. If such a piece is arranged, ability characteristics information of a battle piece (e.g., the battle piece corresponding to Character F of FIG. 17) to be affected by the piece is updated based on the compatibility information 43 (S66).

After the completion of the ability characteristics setting process, the process proceeds to step S22 of FIG. 20.

In step S22, it is determined whether or not the battle mode is selected by the player. If the battle mode is selected, the process proceeds to step S24, and, if the battle mode is not selected, the process proceeds to step S28.

In step S24, from among the operation panels included in the operation panel information 45, the player is caused to select an operation panel to be used in the battle mode.

In step S26, a combat process is performed. Hereinafter, with reference to a flowchart of FIG. 23, a detail of the combat process is described.

(Combat Process)

Figure 23:
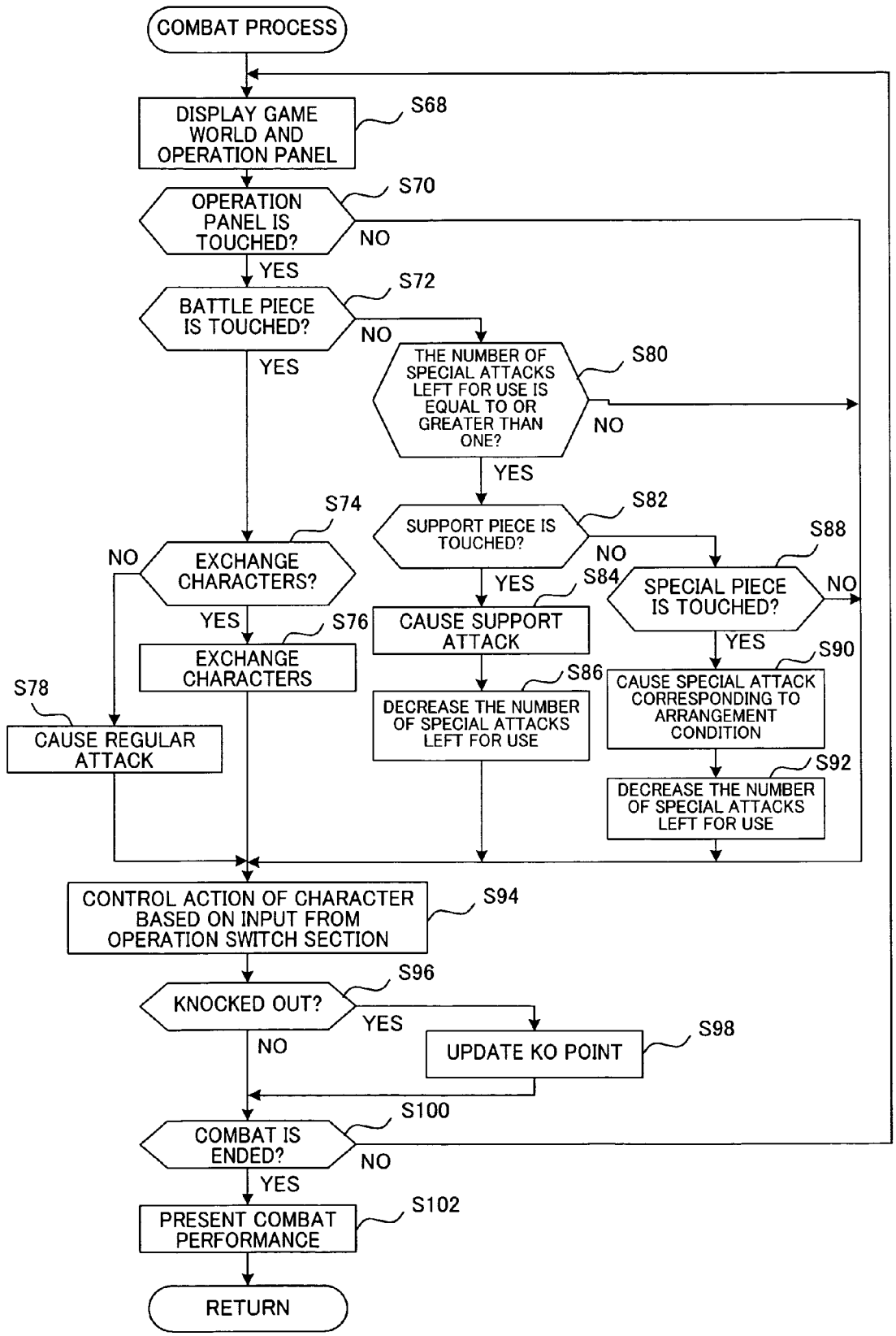
FIG. 23 is a flowchart showing a flow for a combat process.

In step S68 of FIG. 23, a game world is displayed on the first LCD 11 as shown in FIG. 10, and the operation panel selected in the aforementioned step S24 is displayed on the second LCD 12.

In step S70, input coordinates are detected based on a signal from the touch panel 15, and, based on the input coordinates, it is determined whether or not the operation panel is touched by the player. If the operation panel is touched, the process proceeds to step S72, and, if the operation panel is not touched, the process proceeds to step S94.

In step S72, the input coordinates are compared with the positional arrangement information for each piece in the operation panel information 45, and it is determined whether or not a battle piece is touched based thereon. If a battle piece is touched, the process proceeds to step S74, and, if a battle piece is not touched, the process proceeds to step S80.

In step S74, it is determined whether or not a character should be changed, in other words, whether or not a character corresponding to the touched battle piece is different from a character entered in the game world. If the characters are different, the characters are exchanged in step S76, and, if the characters are the same, the character in the game world is caused to perform a regular attack in step S78.

In step S80, it is determined whether or not the number of special attacks left for use is equal to or greater than one. If it is equal to or greater than one, the process proceeds to step S82, and, if it is less than one, the process proceeds to step S94.

In step S82, the input coordinates are compared with positional arrangement information for each piece in the operation panel information 45, and it is determined whether or not a support piece is touched based thereon. If a support piece is touched, the process proceeds to step S84, and, if a support piece is not touched, the process proceeds to step S88.

In step S84, with reference to the character piece information 42, a support attack corresponding to the touched support piece is caused.

In step S86, the number of special attacks left for use is reduced by one.

In step S88, the input coordinates are compared with the positional arrangement information for each piece in the operation panel information 45, and it is determined whether or not a special piece is touched based thereon. If a special piece is touched, the process proceeds to step S90, and, if a special piece is not touched, the process proceeds to step S94.

In step S90, with reference to the special piece information 44, a special attack corresponding to an arrangement condition is caused.

In step S92, the number of special attacks left for use is reduced by one when a special attack is caused in step S90.

In step S94, an action of a player character entered in the game world is controlled based on a signal from the operation switch section 14.

In step S96, it is determined whether or not the player character or an enemy character is knocked out. If either of the characters are knocked out, a KO point (point indicating the number of KOs) for the knocked out character is updated in step S98.

In step S100, it is determined whether or not a combat is ended due to exceeding a time limit or the like. If the combat is ended, the process proceeds to step 102, and, if the combat is not ended, the process returns to step S68.

In step S102, the KO points for the player character and the enemy character are displayed so as to present the player a combat performance.

After the completion of the combat process, it is determined whether or not the game is ended in step S28 of FIG. 20. If the game is ended, the execution of the game program is ended, and, if the game is not ended, the process returns to step S10.

Figure 24:
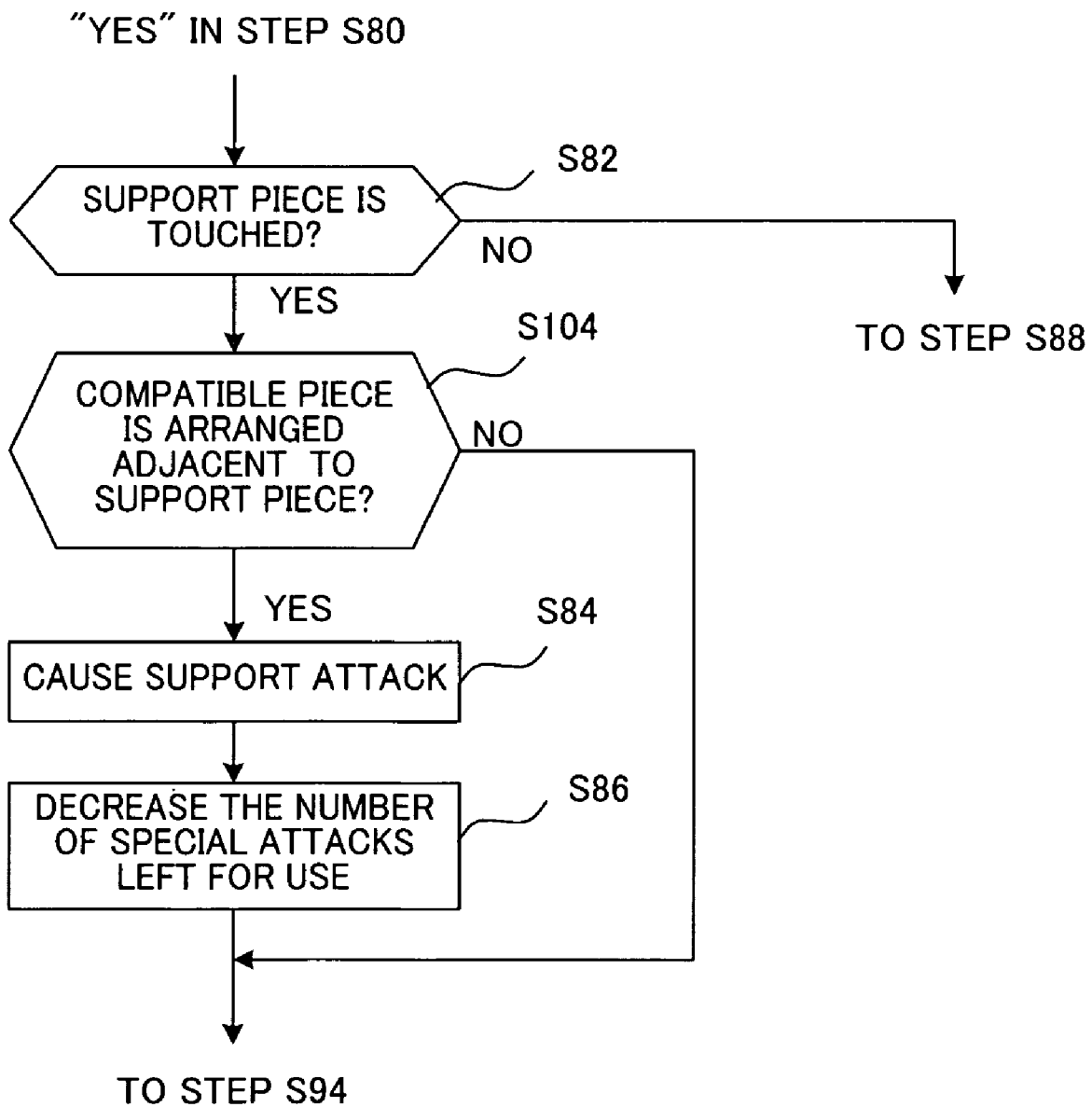
FIG. 24 is a flowchart showing a flow for the combat process according to an alternative example of the exemplary embodiment.

In an alternative example of the present embodiment, when the player touches a support piece in the battle mode, a support attack may be caused only in a case where a character piece is so arranged that a character corresponding thereto and compatible with a character associated with the support piece is adjacent to the support piece. In order to realize the above variation, step S104 such as shown in FIG. 24 may be added between step S82 and step S84 of a combat process of FIG. 23. In other words, if it is determined in step S82 that a support piece is touched, it is determined in step S104 whether or not a piece compatible with the support piece is adjacent thereto based on the compatibility information 43. If a compatible piece is adjacent to the support piece, the process may proceed to step S84, and, if a compatible piece is not adjacent to the support piece, the process may proceed to step S94.

Figure 25:
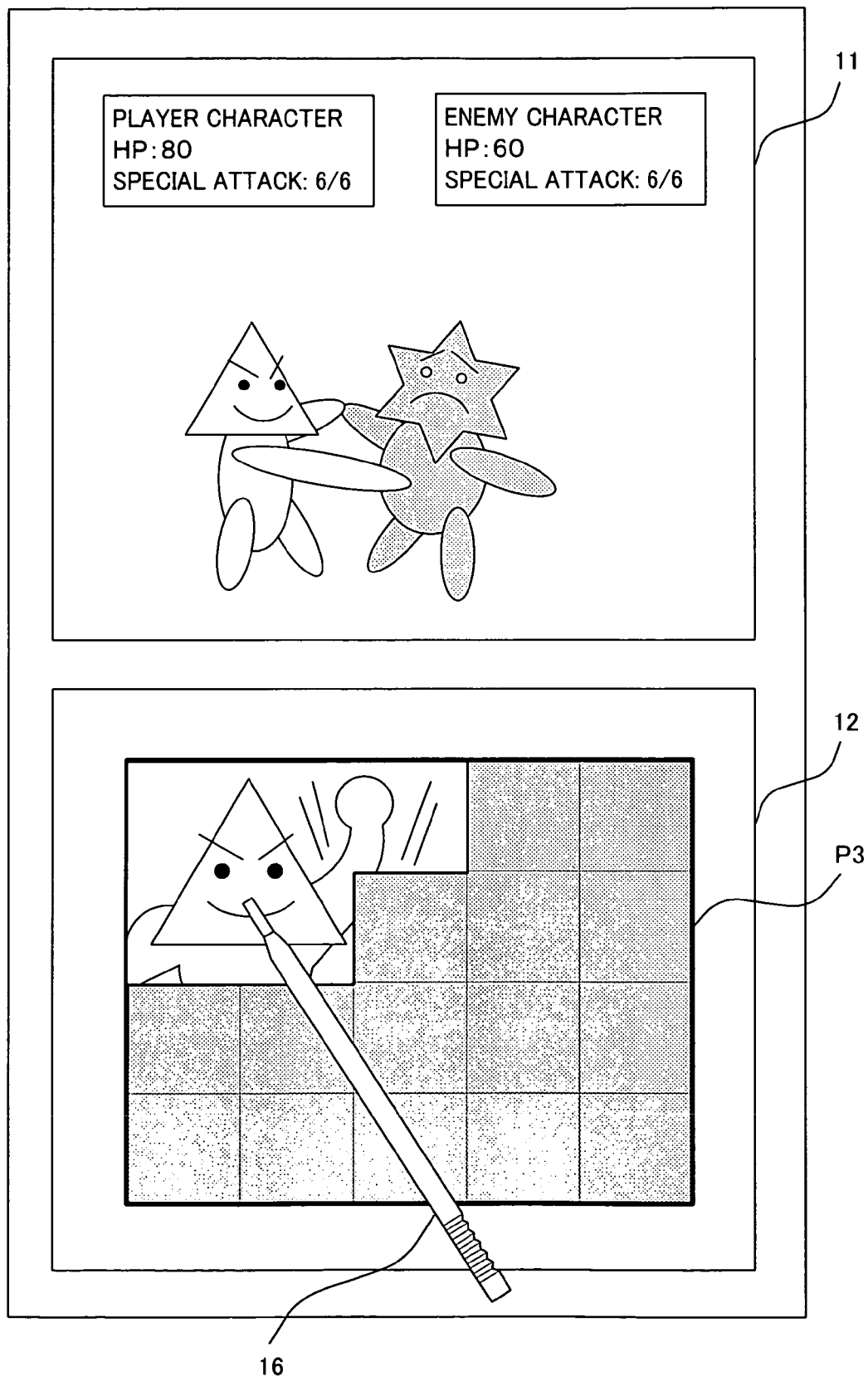
FIG. 25 is an exemplary display according to an alternative example of the exemplary embodiment.
Figure 26:
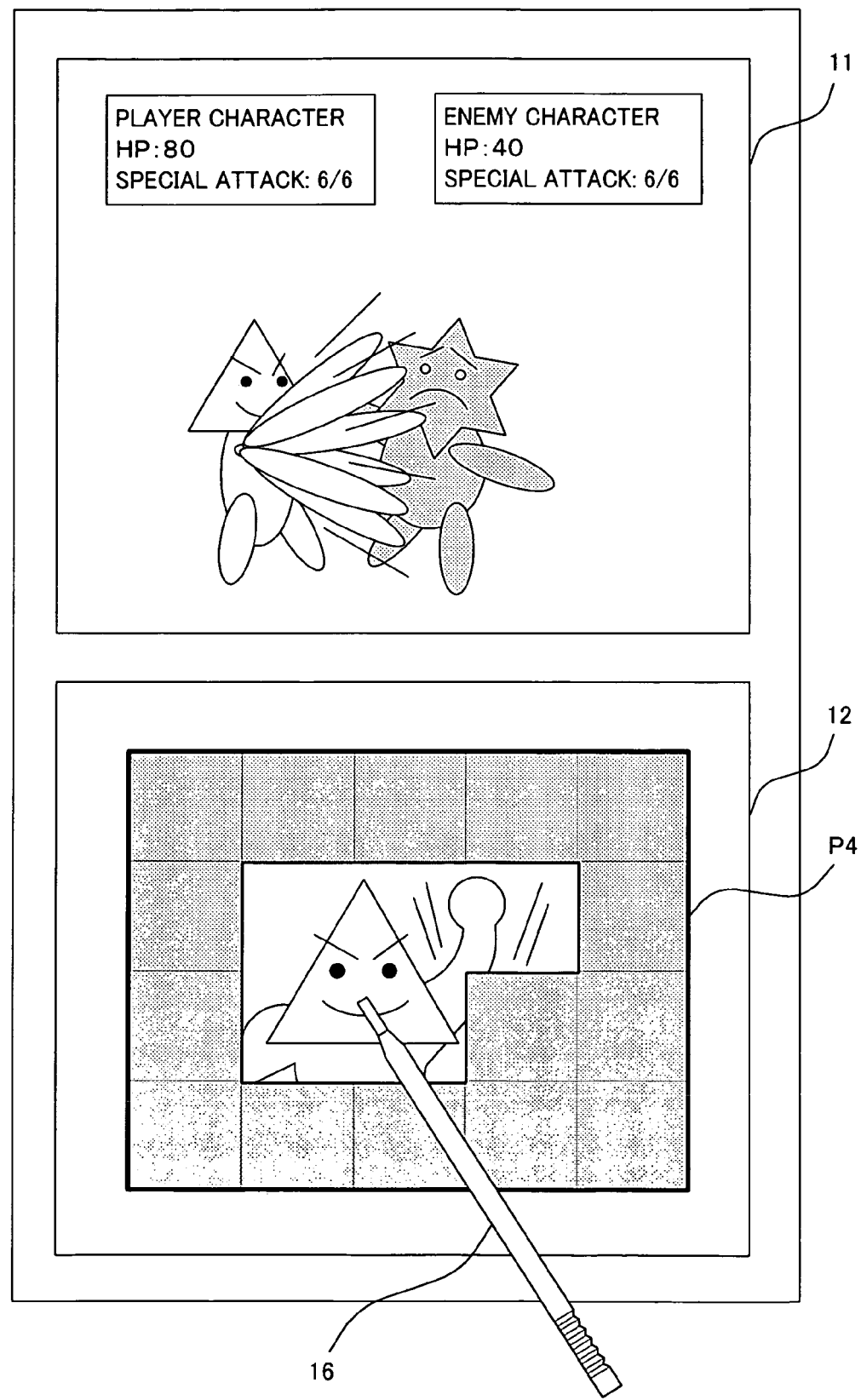
FIG. 26 is another exemplary display according to another alternative example of the exemplary embodiment.

Also, in a further alternative example of the present embodiment, a function of a piece as a key may be changed in accordance with a positional arrangement of the piece in the operation panel. For example, when an operation panel P3 in which the battle piece A5 is arranged so as to be in contact with an edge of the operation panel as shown in FIG. 25 is used, a regular attack may be caused in step S78 (that is, a process executed when the battle piece A5 is touched while Character A is in the game world) of FIG. 23. When the operation panel P3 in which the battle piece A5 is arranged so as not to be in contact with the edge of the operation panel as shown in FIG. 26 is used, an attack more powerful than the regular attack maybe caused in step S78 of FIG. 23.

In the present embodiment, the touch panel 15 is used for selecting a piece on the operation panel in the battle mode, but the present invention is not limited thereto. A pointing device, other than the touch panel, such as a mouse or an operation key such as the cross switch 14*a* may be used for selecting a piece on the operation panel. In a combat game such as the present embodiment, however, a swift input operation is required, and therefore, it is desired that the touch panel 15 be used.

Also, in the present embodiment, two display devices (the first LCD 11 and the second LCD 12) provided to the game apparatus 10 are used, but the present invention is not limited thereto. For example, in the battle mode, the game world and the operation panel may be arranged so as be displayed side-by-side in one screen.

Also, in the present embodiment, a piece is consisted of a square or a plurality of squares combined together, but the present invention is not limited thereto, and an arbitrary shape may be used for a piece. Also, the shape of the operation panel is not limited to a rectangle.

While the exemplary embodiment presented herein has been described in detail, the foregoing description is in all aspects illustrative and not restrictive. It is understood that numerous other modifications and variations can be devised without departing from the scope of the exemplary embodiment.

What is claimed is:

1. A non-transitory computer readable storage medium for causing a computer connected to a display unit for displaying a game screen and an input unit for inputting a player instruction to execute:
a first display control for causing the display unit to display a predetermined operation panel area for arranging a key image;
operation panel generation for generating an operation panel by arranging, in accordance with the player instruction inputted through the input unit, one or more key images, from among a plurality of key images previously prepared, to a position which is in the operation panel area and designated by the player, wherein the key image arranged in the operation panel functions as a graphical user interface for inputting a command for causing a character designated to the one or more key images to perform a predetermined action;
a second display control for causing the display unit to display, together with a game image showing a game world, the operation panel generated in the operation panel generation;
operation detection for detecting, by using the player instruction inputted through the input unit, a key image which is in the operation panel and selected by the player; and
a game process for causing, in response to an operation of selecting a key image performed by the player, the character designated to the selected key image to perform an action which is different in accordance with a positional arrangement for either the selected key image or another key image.

2. The non-transitory computer readable storage medium according to claim 1, wherein the game process includes causing an event to occur, the event being different in accordance with a combination of a plurality of key images which are adjacent to and different from the key image selected by the player in the operation panel.

3. The non-transitory computer readable storage medium according to claim 1, wherein the game process includes causing an event to occur, the event being different in accordance with whether, in the operation panel, a key image having a predetermined relationship with and being different from the key image selected by the player is arranged to a position adjacent to the selected key image.

4. The non-transitory computer readable storage medium according to claim 1, wherein the game process includes causing an event to occur, the event being different in accordance with a positional arrangement in the operation panel for the key image selected by the player.

5. A game apparatus comprising:
a display unit for displaying a game image;
an input unit for inputting a player instruction;
first display control programmed logic circuitry for causing the display unit to display a predetermined operation panel area for arranging a key image;
operation panel generation programmed logic circuitry for generating an operation panel by arranging, in accordance with the player instruction inputted thorough the input unit, one or more key images, from among a plurality of key images previously prepared, to a position which is in the operation panel area and designated by the player, wherein the key image arranged in the operation panel functions as a graphical user interface for inputting a command for causing a character designated to the one or more key images to perform a predetermined action;
second display control programmed logic circuitry for causing the display unit to display, together with a game image showing a game world, the operation panel generated by the operation panel generation programmed logic circuitry;
operation detection programmed logic circuitry for detecting, by using the player instruction inputted through the input unit, a key image which is in the operation panel and selected by the player; and
game process programmed logic circuitry for causing, in response to an operation of selecting a key image performed by the player, the character designated to the selected key image to perform an action which is different in accordance with a positional arrangement for either the selected key image or another key image.

6. A non-transitory computer readable storage medium storing a game program for realizing a game which allows a player to select a character from among a plurality of characters and to operate the selected character so as to play the game, and causing a computer connected to a display unit for displaying a game image and input unit for inputting a player instruction to execute:
first display control for causing the display unit to display a predetermined operation panel area for arranging a character image;
operation panel generation for generating an operation panel by arranging, in accordance with the player instruction inputted through the input unit, one or more character images, from among a plurality of character images respectively associated with the plurality of characters, designated by the player to a position which is in the operation panel area and designated by the player, wherein the character image arranged in the operation panel functions as a graphical user interface for inputting a command designated to the character image;
second display control for causing the display unit to display, during gameplay, the operation panel generated in the operation panel generation, together with a game image showing a game world;

operation detection for detecting, during the game play, a character image which is in the operation panel and selected by the player, by using the player instruction inputted through the input unit; and character control for causing a character associated with the character image selected by the player to appear, in the game world which has been displayed together with the operation panel on the display unit, substantially instantaneously when any of the plurality of character images is selected by the player and for controlling, in accordance with the player instruction inputted through the input unit, an action of the character, wherein the character control includes determining whether the character associated with the character image selected by the player is same as the character already entered in the game world, exchanging, when a determination result in the determining of whether the character associated with the character image selected by the player is same as the character already entered in the game world is "no", the character already entered in the game world for the character associated with the character image selected by the player, for the exchanged character to appear in the game world, and causing, when the determination result in the determining of whether the character associated with the character image selected by the player is same as the character already entered in the game world is "yes", the character already entered in the game world to perform a predetermined action.

7. The non-transitory computer readable storage medium according to claim 6, wherein the operation panel generation includes determining whether a first character image to be arranged in the operation panel area by the player and a second character image already being arranged in the operation panel area satisfy a specific relationship, and a character image synthesis for arranging in the operation panel area, when a determination result in the determining is "yes", a third character image corresponding to the first and the second character images instead of separately arranging the two character images, and the character control includes causing, when the character image selected by the player is either the first or the second character image, a character associated with the either of the first or the second character image not to appear in the game world, and causing, when the character image selected by the player is the third character image, a character associated with the third character image to appear in the game world.

8. A non-transitory computer readable storage medium storing a game program for realizing a game which allows a player to select a character from among a plurality of characters and to operate the selected character so as to play the game, and causing a computer connected to a display unit for displaying a game image and input unit for inputting a player instruction to execute:

first display control for causing the display unit to display a predetermined operation panel area for arranging a character image;

operation panel generation for generating an operation panel by arranging, in accordance with the player instruction inputted through the input unit, one or more character images, from among a plurality of character images respectively associated with the plurality of characters, designated by the player to a position which is in the operation panel area and designated by the player, wherein the character image arranged in the operation panel functions as a graphical user interface for inputting a command designated to the character image;

second display control for causing the display unit to display, during gameplay, the operation panel generated in the operation panel generation, together with a game image showing a game world;

operation detection for detecting, during the game play, a character image which is in the operation panel and selected by the player, by using the player instruction inputted through the input unit; and character control for causing a character associated with the character image selected by the player to appear, in the game world which has been displayed together with the operation panel on the display unit, substantially instantaneously when any of the plurality of character images is selected by the player and for controlling, in accordance with the player instruction inputted through the input unit, an action of the character, wherein the plurality of character images include sets each of which includes a plurality of character images, of various types, associated with a same character and having different sizes, the game program causes the computer to further execute a first ability characteristics setting of changing, depending on the character associated with the character image selected by the player and the size of the character image, ability characteristics of the character associated with the selected character image, and to further execute a parameter setting of changing, depending on a number of character images arranged in the operation panel area, a predetermined game parameter which affects a difficulty level of a game.

9. A game apparatus for realizing a game which allows a player to select a character from among a plurality of characters and to operate the selected character so as to play the game, comprising:

a display unit for displaying a game image;

an input unit for inputting a player instruction;

first display control programmed logic circuitry for causing the display unit to display a predetermined operation panel area for arranging a character image;

operation panel generation programmed logic circuitry for generating an operation panel by arranging, in accordance with the player instruction inputted through the input unit, one or more character images, from among a plurality of character images respectively associated with the plurality of characters, designated by the player to a position which is in the operation panel area and designated by the player, wherein the character image arranged in the operation panel functions as a graphical user interface for inputting a command designated to the character image;

second display control programmed logic circuitry for causing the display unit to display, during gameplay, the operation panel generated in the operation panel generation, together with a game image showing a game world;

operation detection programmed logic circuitry for detecting, during the game play, a character image which is in the operation panel and selected by the player, by using the player instruction inputted through the input unit; and character control programmed logic circuitry for causing a character associated with the character image selected by the player to appear, in the game world which has been displayed together with the operation panel on the display unit, substantially instantaneously when any of the plurality of character images is selected by the player and for controlling, in accordance with the player instruction inputted through the input unit, an action of the character, wherein the character control programmed logic circuitry:

determines whether the character associated with the character image selected by the player is same as the character already entered in the game world, exchanges, when a determination result in the determining of whether the character associated with the character image selected by the player is same as the character already entered in the game world is "no", the character already entered in the game world for the character associated with the character image selected by the player, for the exchanged character to appear in the game world, and causes, when the determination result in the determining of whether the character associated with the character image selected by the player is same as the character already entered in the game world is "yes", the character already entered in the game world to perform a predetermined action.

10. A game apparatus for realizing a game which allows a player to select a character from among a plurality of characters and to operate the selected character so as to play the game, comprising:

a display unit for displaying a game image;

an input unit for inputting a player instruction;

first display control programmed logic circuitry for causing the display unit to display a predetermined operation panel area for arranging a character image;

operation panel generation programmed logic circuitry for generating an operation panel by arranging, in accordance with the player instruction inputted through the input unit, one or more character images, from among a plurality of character images respectively associated with the plurality of characters, designated by the player to a position which is in the operation panel area and designated by the player, wherein the character image arranged in the operation panel functions as a graphical user interface for inputting a command designated to the character image;

second display control programmed logic circuitry for causing the display unit to display, during gameplay, the operation panel generated in the operation panel generation, together with a game image showing a game world;

operation detection programmed logic circuitry for detecting, during the game play, a character image which is in the operation panel and selected by the player, by using the player instruction inputted through the input unit; and character control programmed logic circuitry for causing a character associated with the character image selected by the player to appear, in the game world which has been displayed together with the operation panel on the display unit, substantially instantaneously when any of the plurality of character images is selected by the player and for controlling, in accordance with the player instruction inputted through the input unit, an action of the character, wherein the plurality of character images include sets each of which includes a plurality of character images, of various types, associated with a same character and having different sizes, the game apparatus executes a first ability characteristics setting of changing, depending on the character associated with the character image selected by the player and the size of the character image, ability characteristics of the character associated with the selected character image, and further executes a parameter setting of changing, depending on a number of character images arranged in the operation panel area, a predetermined game parameter which affects a difficulty level of a game.

* * * * *